(12) United States Patent
Rucker et al.

(10) Patent No.: US 9,872,351 B2
(45) Date of Patent: Jan. 16, 2018

(54) DEVICE AND METHOD FOR ENCODING A SIGNAL ON ALTERNATING CURRENT LINES

(71) Applicant: Liteideas, LLC, Mansfield Center, CT (US)

(72) Inventors: Paul D Rucker, Roanoke, VA (US); Todd W Hodrinsky, Mansfield Center, CT (US)

( * ) Notice: Subject to any disclaimer, the term of this patent is extended or adjusted under 35 U.S.C. 154(b) by 75 days.

(21) Appl. No.: 14/986,920

(22) Filed: Jan. 4, 2016

(65) Prior Publication Data

US 2016/0299555 A1 Oct. 13, 2016

Related U.S. Application Data

(60) Provisional application No. 62/144,153, filed on Apr. 7, 2015.

(51) Int. Cl.
*H05B 37/02* (2006.01)
*H05B 39/04* (2006.01)
*H05B 33/08* (2006.01)

(52) U.S. Cl.
CPC ..... *H05B 33/0845* (2013.01); *H05B 37/0263* (2013.01); *Y02B 20/48* (2013.01)

(58) Field of Classification Search
CPC ........................ H05B 33/0815; H05B 33/0845; H05B 37/02; H05B 39/048; H05B 39/04; H05B 33/0818

USPC ........ 315/291, 307, 224, 200 R, 246, 209 R, 315/219, 287
See application file for complete search history.

(56) References Cited

U.S. PATENT DOCUMENTS

| | | | |
|---|---|---|---|
| 2012/0146529 A1* | 6/2012 | Campbell | H02M 1/10 315/210 |
| 2012/0230073 A1* | 9/2012 | Newman, Jr. | H05B 33/0815 363/126 |
| 2012/0235585 A1* | 9/2012 | Lys | H05B 39/044 315/200 R |
| 2013/0033193 A1* | 2/2013 | Datta | H05B 33/0845 315/224 |
| 2013/0154495 A1* | 6/2013 | He | H02M 1/44 315/210 |

* cited by examiner

*Primary Examiner* — Douglas W Owens
*Assistant Examiner* — Wei Chan
(74) *Attorney, Agent, or Firm* — Law Office of Ilya Libenzon

(57) ABSTRACT

A smart dimming network encoder is connected to an alternating current power source having a substantially regular period of cycles. The encoder includes a bipolar switch connecting the alternating current power source to a modified alternating current line, the bipolar switch having an on state permitting the modified alternating current line to conduct alternating current from the alternating current power source and an off state preventing conduction on the modified alternating current line. The encoder includes a processor coupled to the bipolar switch, the processor configured to receive a control signal at a control signal input and to switch the bipolar switch to the off state for an off time having a duration corresponding to the control signal.

17 Claims, 24 Drawing Sheets

500

Sensing, by a Processor Coupled to a Modified Alternating Current Line Having a Modified Alternating Current Signal, an Off Time in the Modified Alternating Current Signal
501

Emitting, by the Processor, a Control Signal Based on the Detected Off Time
502

*FIG. 5*

DEVICE AND METHOD FOR ENCODING A SIGNAL ON ALTERNATING CURRENT LINES

TECHNICAL FIELD

The device and methods disclosed herein relate generally to power supplies, and particularly to regulation of power over alternating current lines.

BACKGROUND ART

Dimmer circuits for lighting are popular and ubiquitous, allowing users to set their lighting to desired levels for various tasks. However, the traditional dimming circuits lack the flexibility to keep up with modern innovation in lighting and electronics. Dimmers designed for incandescent lighting do not work properly on forms of lighting more recently developed for greater energy efficiency, such as direct off-line-driven light-emitting diode (LED) lighting. One reason for this is that these dimmers require 15-25 W to operate which is incompatible with the low power associated with more efficient lighting systems. Existing solutions, such as the traditional triac dimmer, have drawbacks of their own. For instance, because of the forward voltage of series-connected LEDs, conduction only occurs near the peaks of the alternating current (AC) waveform, causing inconsistent and inefficient light output. As a result, operation of LEDs using triac dimmer results in extremely non-linear dimmer operation.

Thus, there remains a need for an efficient dimming control capable of controlling high-efficiency lighting and presenting a linear dimming profile.

SUMMARY

In one aspect, a smart dimming network encoder is connected to an alternating current power source having a substantially regular period of cycles. The encoder includes a bipolar switch connecting the alternating current power source to a modified alternating current line, the bipolar switch having an on state permitting the modified alternating current line to conduct alternating current from the alternating current power source and an off state preventing conduction on the modified alternating current line. The encoder includes a processor coupled to the bipolar switch, the processor configured to receive a control signal at a control signal input and to switch the bipolar switch to the off state for an off time having a duration corresponding to the control signal.

In a related embodiment, the bipolar switch includes a first transistor having a first control terminal such that when the first control terminal has a positive voltage in excess of a threshold amount, the first transistor is on, and a second transistor having a second control terminal such that when the second control terminal has a positive voltage in excess of the threshold amount, the second transistor is on. In an additional embodiment, each of the first transistor and the second transistor is a voltage-controlled transistor having capacitance at its control terminal to hold voltage at the control terminal essentially constant for at least one half-cycle of the alternating current power source. An additional embodiment further includes a gate driver, the gate driver configured to send a negative voltage pulse of at least the threshold amount to each of the first control terminal and second control terminal at the beginning of the off time, and to send a positive voltage pulse equal to at least the threshold amount to each of the first control terminal and the second control terminal at the end of the off time. In a further embodiment, the gate driver also includes a transformer configured to issue a negative voltage pulse in response to a negative square wave input generated by the processor and to issue a positive voltage pulse in response to a positive square wave input generated by the processor. In still another embodiment, the gate driver further includes an inverting gate driver and a non-inverting gate driver, the inverting gate driver and non-inverting gate driver configured to receive input from the processor and to output a negative square wave output to the transformer at the beginning of the off time and a positive square wave output to the transformer at the end of the off time.

Another related embodiment also includes a discharge circuit connected to the modified alternating current line, the discharge circuit having a transistor configured to switch on during the off-time and discharge non-zero voltages through a resistor. In another embodiment, the processor further includes a voltage sample input connected to the alternating current power source. In still another embodiment, the voltage sample input is connected to the alternating current power source by way of a full-wave rectifier. In a further embodiment, the voltage sample input is connected to the alternating current power source by way of a resistive divider. In yet another embodiment, the resistive divider is adjustable. In an additional embodiment, the control signal input is connected to an external device adapted to transmit a control signal. A further embodiment still includes a dimmer control connected to the control signal input. Another embodiment also includes a kill switch coupled to the processor, and the processor is configured to stop sending signals to the bipolar switch when the kill switch is activated, and the bipolar switch is configured to switch off when not receiving signals from the processor.

In another aspect, method for encoding signals in a modified alternating current line includes receiving, by a processor, a control signal. The method includes sampling, by the processor, an alternating current waveform having a substantially regular period of cycles produced by an alternating current power source. The method includes calculating, by the processor, an off time having a duration based on the control signal. The method includes switching off, by the processor, a bipolar switch connecting the alternating power source to a modified alternating current. The method includes switching on, by the processor, the bipolar switch upon passage of the duration.

In a related embodiment, switching off the bipolar switch further involves switching off the bipolar switch substantially half of the duration prior to a zero-crossing time in the alternating current waveform. In an additional embodiment, switching off the bipolar switch also involves calculating, by the processor, the zero-crossing time and switching the bipolar switch off approximately half the duration before the zero-crossing time. In yet another embodiment, calculating the zero-crossing time further involves detecting a voltage peak time in the alternating current waveform and solving an equation describing the waveform for a zero-intercept time in the alternating current waveform. In a further embodiment still, solving for the zero-intercept time also includes adding a quarter of the period to the voltage peak time. In still another embodiment, switching off the bipolar switch further includes detecting, by the processor, a logic zero time at which the sampled alternating current waveform drops to logic zero, retrieving, by the processor, a stored value substantially equal to the difference between the logic zero time and the zero-crossing point, subtracting, by the processor, half of the duration from the difference to obtain a switch-off time, and switching off the bipolar switch at the switch-off time.

Other aspects, embodiments and features of the disclosed device and method will become apparent from the following detailed description of the invention when considered in conjunction with the accompanying figures. The accompanying figures are for schematic purposes and are not intended to be drawn to scale. In the figures, each identical or substantially similar component that is illustrated in various figures is represented by a single numeral or notation at its initial drawing depiction. For purposes of clarity, not every component is labeled in every figure. Nor is every component of each embodiment of the device and method is shown where illustration is not necessary to allow those of ordinary skill in the art to understand the device and method.

BRIEF DESCRIPTION OF THE DRAWINGS

The preceding summary, as well as the following detailed description of the disclosed device and method, will be better understood when read in conjunction with the attached drawings. It should be understood that the invention is not limited to the precise arrangements and instrumentalities shown.

FIG. 3I is a schematic diagram depicting an embodiment of a modified AC encoder as described herein;

FIG. 5 is a flow diagram illustrating a method for decoding a modified alternating current signal.

DETAILED DESCRIPTION OF SPECIFIC EMBODIMENTS

Embodiments of the disclosed smart dimming system provide a convenient and efficient way to dim high-efficiency lighting driven by an AC power source. In some embodiments, elements of the disclosed system can be incorporated in preexisting electrical networks within homes or businesses, controlling new fixtures using the newly installed system while permitting operation of legacy fixtures by previous means. Some embodiments of the system allow dimming of smart fixtures and full operation of other fixtures or appliances on the same circuit. Embodiments of the dimmable power source draw very little power for controls, increasing the efficiency of the system.

Figure 1A:
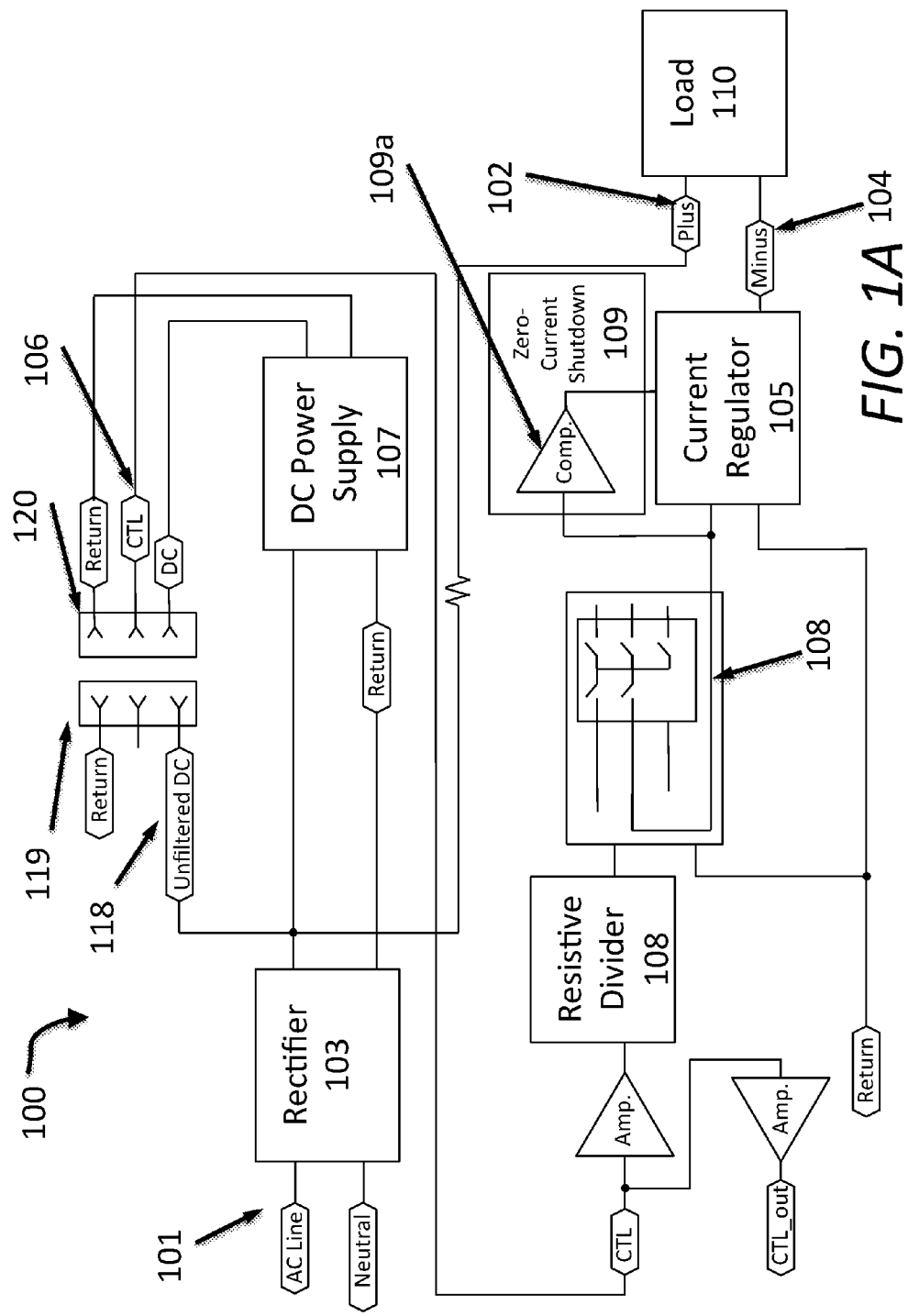
FIG. 1A is a block diagram depicting an embodiment of a driver as described herein.

FIG. 1A presents a block diagram of an embodiment of a driver 100 for high-efficiency lighting. The driver 100 has a power input 101 that receives AC power. The driver has a power supplying power to a load 110, with a first terminal 102 and a second terminal 104. The first output terminal 102 may be connected to the power input 101 by a rectifier 103, and provides rectified voltage from the power input 101. The second output terminal 104 provides a return path from the load 110 by way of at least one current regulator 105 that regulates current in response to commands received via a control input 106. In some embodiments, the driver 100 also includes a direct current power supply 107 that receives power from the rectifier 103; in some embodiments, the direct current power supply 107 provides the driver 100 with power to operate. The driver 100 may connect via the first output terminal 102 and the second output terminal 104 to the load 110.

The load 110 may include at least one electric light. The at least one electric light may include at least one electroluminescent light, such as an LED. The at least one electric light may include a plurality of electroluminescent lights; for instance, the at least one electric light may include a mesh of LEDs connected in series and in parallel by conductors.

Figure 1B:
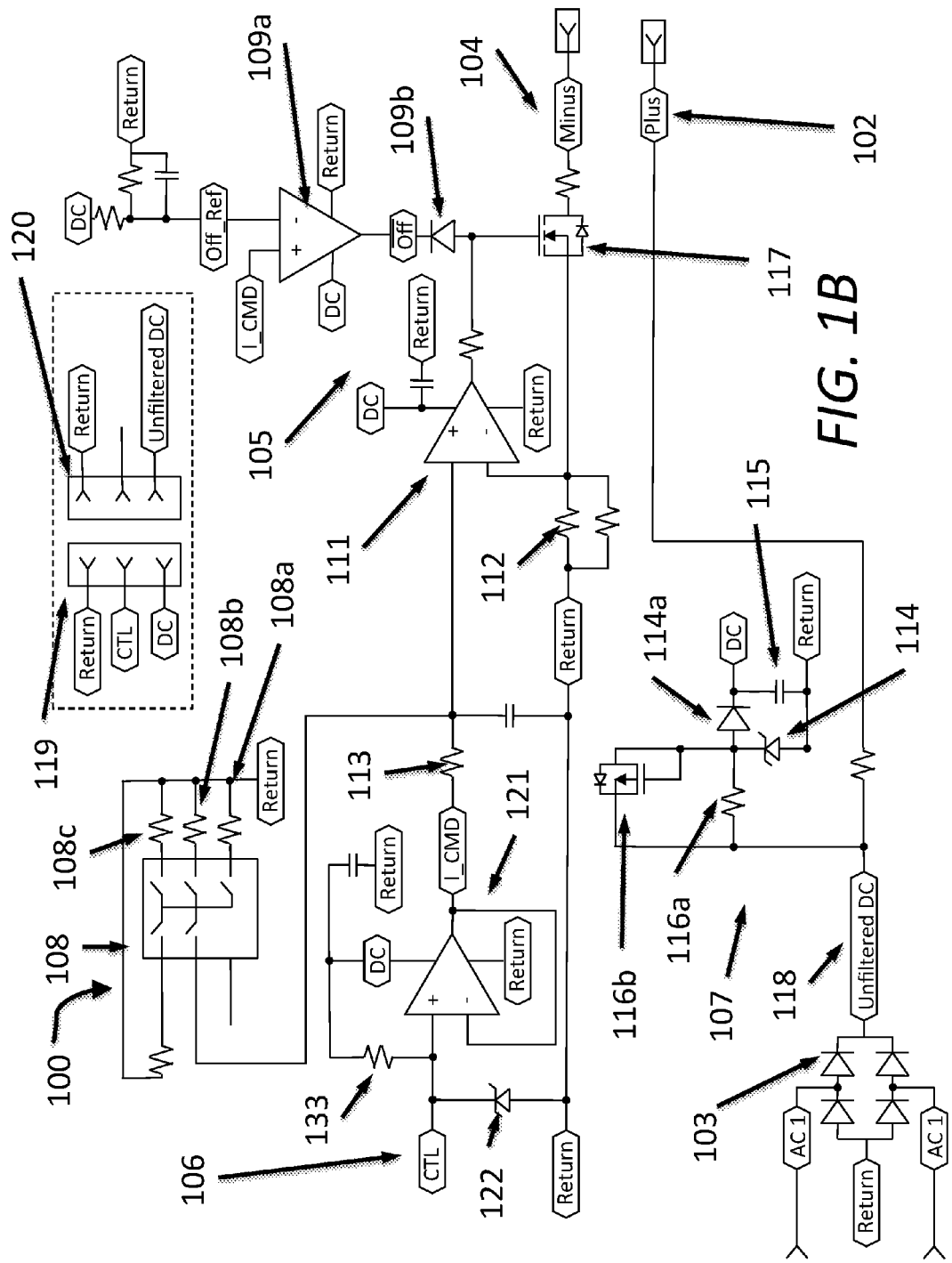
FIG. 1B is a schematic diagram depicting an embodiment of a driver circuit as described herein.

The rectifier 103 may be a full-wave rectifier. The rectifier 103 may be a bridge rectifier. In some embodiments, the rectifier 103 is a high-power rectifier; as an example, the rectifier 103 may have a maximum average rectified forward current of at least 1 Ampere. The rectifier 103 may have a maximum average rectified forward current of at least 1.5 A. The rectifier 103 may have a maximum non-repetitive peak forward surge current of at least 50 A. The rectifier 103 may have a maximum repetitive reverse voltage level of at least 1000 V. The rectifier 103 may have a maximum root-mean-square ("RMS") bridge input voltage of at least 700 V. The rectifier 103 may have a maximum DC reverse voltage of at least 1000 V. As a non-limiting example, as shown in FIG. 1B, the rectifier 103 may be an MB10S bridge rectifier as manufactured by Fairchild Semiconductor Corporation of San Jose, Calif., or a rectifier with similar properties. In some embodiments, the driver 100 includes a filter (not shown) to produce a substantially constant DC voltage output; the filter may restrict fluctuations in DC voltage to a particular range substantially less than the fluctuations present in the unfiltered output from the rectifier 103.

The control input 106 receives a control signal. In some embodiments, the control signal is a pulse width modulated signal. In other embodiments, the control signal is a voltage controlled signal; the voltage controlled signal may have a range of possible values between a minimum value and a maximum value. As a non-limiting example, the voltage control signal may be a 0-10 VDC signal. The minimum voltage of the voltage control signal may be ground voltage. The minimum voltage of the voltage control signal may be a virtual ground or reference voltage, such as the return voltage of the driver 100. The minimum voltage may be positive, negative or zero. The maximum voltage may likewise be positive, negative, or zero. Without limitation, the voltage control signal may range from 0 to 10, from 0 to −10, or any other range of voltages.

In some embodiments, the at least one current regulator 105 modifies the current flowing through the at least one current regulator 105 from the second output terminal 104 in response to the control signal. As illustrated in FIG. 1B, the at least one current regulator 105 may include a transistor 117 that modifies the current as determined by a voltage derived from the control signal. For example, the at least one current regulator 105 may apply a voltage based on the control signal at the base of the transistor 117 where the transistor 117 is a bipolar junction transistor. The at least one current regulator 105 may apply a voltage based on the control signal at the gate of the transistor 117 where the transistor 117 is a field-effect transistor. In some embodiments, the transistor 117 is a metal-oxide-semiconductor field-effect transistor ("MOSFET"). The transistor 117 may be a transistor capable of operating at high currents; for instance, the transistor 117 may be a MOSFET capable of a maximum continuous drain current of 6 A or more at an operating temperature of 25 degrees Celsius. The transistor 117 may be a MOSFET capable of a maximum continuous drain current of 3.8 A or more at an operating temperature of 100 degrees Celsius. The transistor 117 may be a MOSFET capable of a maximum pulsed drain current of 24 A. The transistor 117 may be a MOSFET capable of a maximum current during a repetitive or signal pulse avalanche of 2 A. The transistor 117 may be a MOSFET capable of sustaining a pulse having a single pulse avalanche energy of 88 millijoules. As a non-limiting example, the transistor 117 may be a STD7N80K5 MOSFET, as manufactured by ST Microelectronics, of Geneva, Switzerland.

The at least one current regulator 105 may include an operational amplifier 111. In some embodiments, the amplifier 111 has an output 111a supplying voltage based on the control signal to the control terminal of the transistor 111; the control terminal is the terminal of the transistor 117 used to regulate current through the transistor, such as the base of a bipolar junction transistor or the gate of a MOSFET. As an example, where the transistor 117 is a field-effect transistor, the amplifier output 111a may connect to the gate of the transistor 117. Where the transistor 117 is a bipolar junction transistor, the output 111a may connect to the base of the transistor 117. In some embodiments, the where the control signal is a voltage control signal, the control signal is applied to the non-inverting input 111a of the amplifier 111, resulting in a gain proportional to the control signal. The at least one current regulator may provide voltage based on the current returning from a load to the second output terminal 102, resulting in the amplifier 111 to produce the necessary output voltage to cause the transistor 117 to permit current to match the control voltage at the non-inverting input 111b. For instance, the input to the inverting terminal may be part of a loop including one or more resistors 112, such that the amplifier 111 produces an output that causes transistor 117 to produce a current which causes the voltage drop across the at least one resistor 112 to match the voltage at the non-inverting input. The at least one resistor 112 may be a plurality of parallel resistors. Continuing the example, in some embodiments, where the power supplied by the driver 100 is rectified, the operational amplifier creates whatever positive output it needs on the gate of the transistor 117 to make the current flowing through the at least one resistor 112 produce the same voltage as the voltage signal at the non-inverting input of the amplifier 111; assuming that a sufficiently high DC current can be drawn from the load, the voltage drop across the at least one resistor 112 may match the voltage at the non-inverting input of the amplifier 111.

Further continuing the example, in embodiments where the power supplied by the driver 100 is in the form of unfiltered rectified voltage, the voltage at the first output terminal 102 varies between 0 and the amplitude of the rectified voltage wave. The voltage at the transistor 117 may be the voltage at the first output terminal 102 minus the voltage drop across the load; for instance, where the load is a mesh of LEDs, the voltage drop is determined by the forward voltage of the LEDs. Further continuing the example, in some embodiments, the voltage coming into the transistor 117 thus varies from 0 to a value equal to the output voltage minus the voltage drop across the load, and the transistor 117, as modulated by the amplifier, acts as a variable resistor, limiting the current to values producing the requisite voltage drop across the at least one resistor 112. Where the voltage drops near to 0, the transistor 117 may switch all the way on; the current through the transistor 117 may nonetheless drop to 0 due to the lack of electric potential. As a result, the voltage across the resistors 112 over time may resemble a square wave, with a mostly constant voltage punctuated by periodic drops to zero. The resulting current through the transistor 117, and thus power to the load may appear to be constant to a user, because of the rapidity of the oscillation and the relative brevity of the moments with zero voltage. In some embodiments, in the absence of a control signal, the transistor 117 conducts at full power; in some embodiments, this is because a resistor 133 located at the control signal input 106 is connected to the power source 107, creating a DC signal in the absence of a control signal.

In some embodiments, as shown in FIG. 1A, the driver 100 includes a zero-current shutdown 109 that causes the current flowing through the at least one current regulator 105 to drop to zero. In some embodiments, where the control signal is a voltage control signal, the zero-current shutdown 109 switches off the current through the at least one current regulator 105 when the control signal drops down to within a few tens of millivolts of zero. In some embodiments, the zero-current shutdown 109 includes a comparator 109a that looks at the voltage of the control signal input, compares it to a reference voltage, and causes the at least one current regulator 105 to shut off all power to the load 110 upon the control signal voltage dropping below the reference voltage; the reference voltage may be within a few millivolts of zero. As illustrated in FIG. 1B, the comparator 109a may output sufficient voltage to reverse-bias a switching diode 109b as long as the control signal is above the reference voltage, preventing conduction through the switching diode 109b; when the control signal falls below the reference voltage, the comparator output may switch to the return voltage, forward-biasing the switching diode 109b, and causing the voltage supplied to the gate or base of the transistor 117 to drop to near zero, shutting off current to the load 110.

Figure 1C:
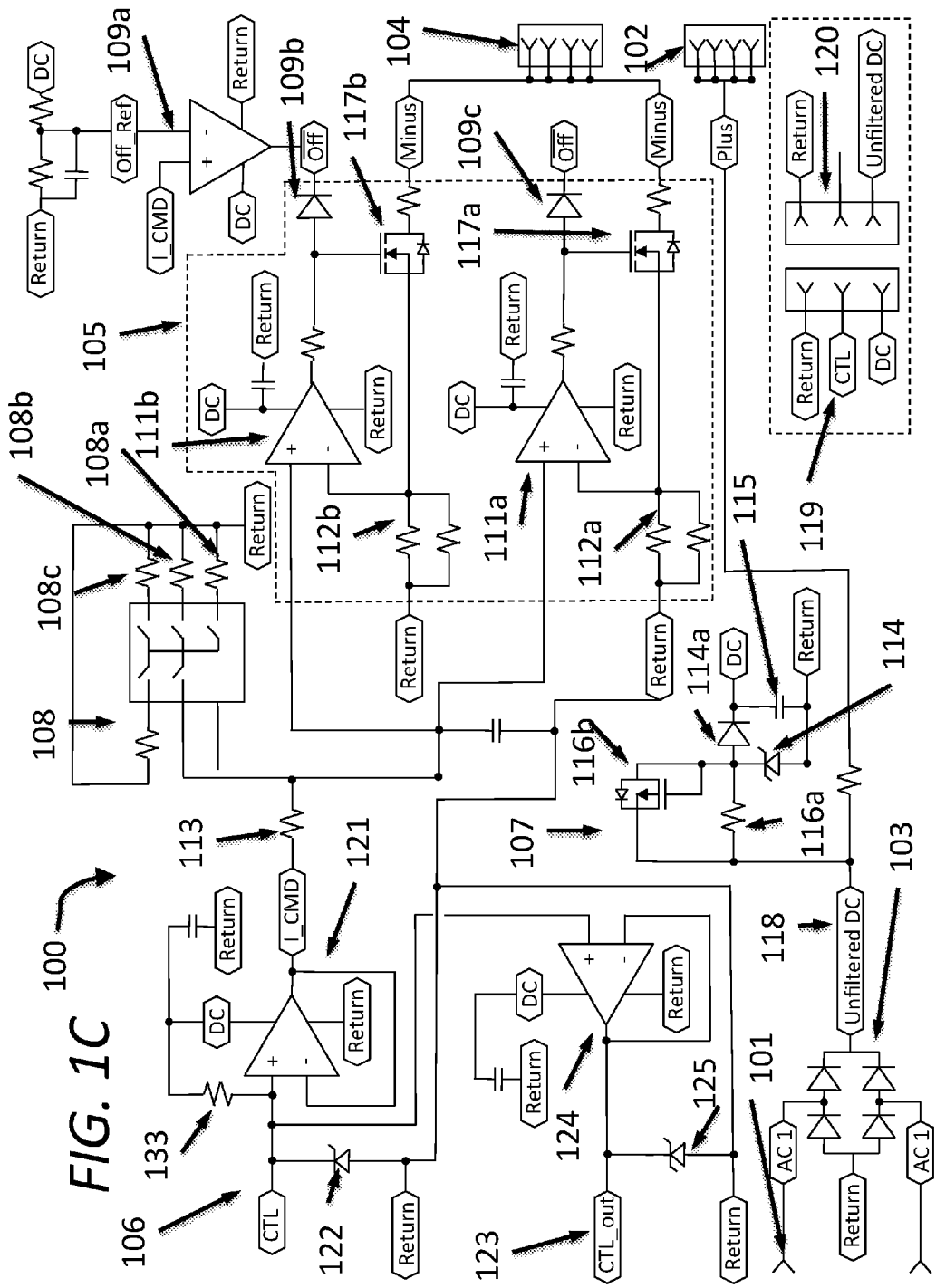
FIG. 1C is a schematic diagram depicting an embodiment of a driver circuit as described herein.

In some embodiments, as shown in FIG. 1C, the at least one current regulator 105 includes a plurality of current regulators 105. For instance, the circuit of the driver 100 may branch to include a first current regulator 105a and a second current regulator 105b. The impedance of the first current regulator 105a may be substantially equal to the impedance of the second current regulator 105b, so that the control signal is distributed equally to each regulator. In some embodiments, the first current regulator 105a has a first transistor 117a that regulates the current as directed by an input voltage based on the divided control signal at its base or gate. The first transistor 117a may be any transistor suitable for use as the transistor 117 described above in reference to FIG. 1B. The first current regulator 105a may have an operational amplifier 111a supplying voltage based on the divided control signal to the base or gate of the first transistor 117a; the operational amplifier 111a may function in the same way as the operational amplifier 111 described above in connection with FIG. 1B. The operational amplifier 111a may use negative feedback supplied to its inverting terminal, such that the operational amplifier compares the voltage drop across at least one resistor 112a due to the current through the at least one resistor 112a as supplied by the transistor 117a, as described above in reference to FIG. 1B; the resistance of the at least one resistor 112a may be less than the resistance of the at least one resistor 112 to match the divided control signal. As an example, where the at least one resistor 112 in the current regulator 105 receiving an undivided control signal is 10Ω, the at least one resistor 112a in the current regulator 105a receiving a divided control signal may be 3.9Ω.

The second current regulator 105b may have a second transistor 117b; the second transistor 117b may be as described above in reference to the first transistor 117a. The second current regulator 105b may have a second amplifier 111b, which may function in the same way as the first amplifier 111a; the second amplifier 111b may use negative feedback to match the voltage across a second at least one resistor 112b based on the current from the second transistor 117b to the divided control signal, as described above in reference to the first current regulator 105a.

In some embodiments, the zero-current shutoff 109 also branches to both current regulators 105a-b; for instance, the comparator 109a may have sufficient voltage to reverse-bias a first switching diode 109b connected to the path from the first amplifier 111a to the first transistor 117a, and to reverse-bias a second switching diode 109c connected to the path from the second amplifier 111b to the second transistor 117b while the control signal is greater than a reference voltage, as described above in connection with FIG. 1B. The comparator 109a may supply return voltage to both switching diodes 109b-c when the control signal falls below the reference voltage, forward biasing both switching diodes 109b-c and causing the voltage at the base or gate of each of the first transistor 117a and second transistor 117b to drop to near zero, shutting off current through the first transistor 117a and second transistor 117b.

In some embodiments, the use of a plurality of current regulators 105 for load-balancing permits the driver 100 to supply a greater quantity of power to the load 110, by sharing the current substantially equally among the plurality of current regulators 105. The driver 110 may provide multiple first output terminals 102 and multiple second output terminals 104, allowing the driver 100 to drive several loads (not shown) simultaneously; for instance, the driver 100 may have four first output terminals 102 and four second output terminals 104. The load 110 or loads may be configured to take advantage of the load-balancing properties provided by a plurality of current regulators 105a; for instance, where the load 110 is an LED mesh, the load 110 may be made up of two or more separate circuits, each connected to a different first output terminal 102 and second output terminal 104; as result, a failure of one circuit in the LED mesh may not compromise a second circuit in the LED mesh, permitting the mesh to continue emitting light.

In some embodiments, the load 110 or loads and driver 100 are configured such that the load or loads typically run at a fraction, such as 60%, of the maximum rated power of the components of the load or loads. Thus, power surges through the driver 100 to the load 110 or loads may be absorbed by the load or loads themselves, using the excess power consumption available in the load 110 or loads. In some embodiments, the failure of a component of the load or loads causes more power to be diverted to the remaining components of the load or loads. For instance, where an LED in a mesh fails, ending conduction through that LED, power through each LED or set of LEDs in parallel with the failed LED increases as a result; unlike in conventional LED meshes which run at or near the maximum power rating for each LED, the other LEDs in the mesh may absorb the additional current, increasing their power consumption to a higher, but still manageable, rate without failing as well. As a result, the load or loads may not suffer cascading component failures when a single component fails, resulting in negligible performance loss from isolated failures, and a greater useable lifetime for the load or loads. In some embodiments, the load or loads combine the use of multiple circuits driven by the multiple output terminals 102, 104 with driving at power below the maximum ratings to provide multiple categories of robustness; the failure of any single circuit due to a single component failure is reduced by the use of fractional power consumption, and the failure of an entire circuit in the load or loads does not prevent the remaining circuits or circuit from operating normally.

In some embodiments where the control signal is a voltage control signal, as shown in FIG. 1A, the driver 100 includes a resistive divider switch 108. The resistive divider switch 108 places a voltage divider between the control signal input 106 and the at least one current regulator 105. In some embodiments, the resistive divider 108 has the effect of reducing the voltage of the voltage control signal provided to the at least one current regulator 105 based on the resistance of the resistive divider switch 108; the resistive divider switch 108 may have a selectable resistance, permitting the use of the resistive divider switch 108 to a power output level for the at least one current regulator 105 using the resistance of the resistive divider switch 108. In some embodiments, the resistive divider switch 108 draws negligible current. As a non-limiting example, the resistive divider switch 108 may permit the selection of a value causing the at least one current regulator 105 to produce 100% power by the inclusion of a first resistor 108a in the resister divider switch 108 circuit; for instance, where a series resistor 113 has a resistance of 909 KΩ and the first resistor 108a has a resistance of 100 KΩ the voltage provided to the at least one current regulator 105 may be approximately 100% of the voltage control signal voltage, and the at least one current regulator 105 may be calibrated to provide full power when the control signal provided to the at least one current regulator 105 is 1 V. Likewise, the resistive divider switch 108 may permit the selection of 75% power by inclusion of a second resistor 108b in the resister divider switch 108 circuit, of 50% power by inclusion of a third resistor 108c in the resistor divider switch 108 circuit, or of 25% power by including a fourth resistor 108d. The driver 100 may include a manual switch (not shown) permitting a user to select the resistance of the resistive divider switch 108. For instance, the user may be able to turn a knob, such as a 4-position rotary switch, between positions indicating 100% power, 75% power, 50% power, and 25% power. The resistors in the resistive divider switch 108 may be chosen to produce any percentage output desired. In some embodiments, the resistors are replaced with a potentiometer or similar device having adjustable resistance to allow continuous adjustment of the power level.

In some embodiments, as shown in FIGS. 1A-C, the driver 100 includes a power supply 107 that provides DC power to the driver 100. The power supply 107 may provide DC power to other components connected to the driver 100, such as an adapter 200 or signal receiver 300 as described in further detail below in connection with FIGS. 3A-3H3. The power supply 107 may draw rectified voltage from the rectifier 103. In some embodiments, as shown in FIG. 1B, the power supply 107 includes a transient voltage suppressor 114; the transient voltage suppressor 114 may clamp the voltage provided by the power supply 107 at a desired constant value. For instance, the transient voltage suppressor 114 may limit the voltage across it at about 11 volts, DC. In some embodiments, the transient voltage suppressor 114 is an SMF9.0A produced by Littlefuse, Inc. of Chicago, Ill., or a transient voltage suppressor with similar properties. In other embodiments, the transient voltage suppressor 114 is a Zener diode. The transient voltage suppressor 114 may be any circuit element or set of circuit elements that acts to regulate voltage. The transient voltage suppressor 114 may also protect circuits using the power supply 107 from power surges. In some embodiments, the power supply 107 includes a capacitor 115 to filter the voltage signal and set a constant value; the constant voltage may be 10 V DC. In some embodiments, the power supply 107 includes a diode 114a to further reduce the voltage to the required steady value. The power supply 107 may include a resistor 116a; the resistor 116a may act to limit the current through the power supply 107, so that the power supply 116a can provide substantially constant current over varied voltage inputs. In other embodiments, the power supply 107 includes a depletion-mode MOSFET 116b or similar transistor wired to provide an Idss of 1-2 mA; the depletion-mode MOSFET 116b may enable the power supply 107 to provide a constant current regardless of input voltage, to supply all of the current needed by components using the power supply 107. Although the resistor 116a and the depletion-mode MOSFET 116b are shown in parallel in FIGS. 1B-1C, in some embodiments the power supply 107 includes the MOSFET 116b without the resistor 116a or the path containing the resistor 116a. Likewise, in some embodiments, the power supply 107 includes the resistor 116a but does not include the MOSFET 116b or the path containing the MOSFET 116b.

In some embodiments, the driver 100 has an unfiltered DC output terminal 118, which enables the driver 100 to provide the voltage from the rectifier 103 to an additional device, such as the modified AC decoder 200 described below in connection with FIGS. 2A-2F. In some embodiments, the driver 100 includes one or more of its various input or output terminals into headers that can plug into another device. As a non-limiting example, the control signal input, return wire, and power output from the power supply 107 may be supplied to one three-pin header 119, and the unfiltered DC from the rectifier 103 and a return may be supplied to two pins of a second three-pin header 120; without limitation, the first three-pin header 119 may be a 91614-303G header, as manufactured by FCI Americas Technology, LLC of Carson City, Nev., and the second three-pin header may be a 91614-303G header; the header may be a similar product.

In some embodiments, the driver 100 the control signal input 106 connects to the input to a voltage follower 121. The voltage follower 121 may ensure that the driver 100 does not reduce the voltage of the control signal to any non-negligible degree, by presenting an extremely high input impedance to the control signal, while drawing the necessary current to maintain a signal to the at least one control circuit 105 that matches the voltage of the control signal. The input to the voltage follower may include a parallel transient voltage suppressor 122. In some embodiments, the transient voltage suppressor 122 has a minimum clamping voltage of 19.1 V, a maximum clamping voltage of 25 V, and a peak power dissipation of 300 W; the transient voltage suppressor may be a T12S5, produced by Diodes, Incorporated of Dallas, Tex., or a similar device. The control signal input may be a separate port from the headers; in other embodiments, the headers supply the only control signal input.

In some embodiments, the driver 100 also includes a control signal output port 123 that relays the control signal from the control signal input 106; in some embodiments, the output terminal 123 receives the control signal by connecting between the input port 106 and the voltage follower 121. The driver 100 may include a second voltage follower 124 whose output goes to the output port 123; the second voltage follower 124 may ensure that the necessary current is supplied, for instance from the power source 107 to maintain the voltage level of the control signal, while presenting the driver circuit 100 with a high input impedance so that the control signal to the voltage follower 121 is not reduced. The output port 123 may have a parallel transient voltage suppressor 125; the transient voltage suppressor 125 may be as described above for a transient voltage suppressor 122. In other embodiments, there is no control signal output port 123.

The control signal output port 123 may permit a second device capable of receiving a control signal to receive the control signal from the driver 100a. The second device may be a second driver 100b; the second driver 100b may be constructed as disclosed above for a driver 100 in connection with FIGS. 1A-1D. In some embodiments, the control signal output port 123 is wired directly to the control input 106b of the second driver 100b. In other embodiments, the control signal output port 123 of the first driver 100a connects to the control signal input 106b of the second driver 100b by way of an adapter 126. As illustrated in FIG. 1F, the adapter 126 may have an input port 127 that receives a control signal, and an output port 128 that outputs a control signal. In some embodiments, the adapter 126 has a voltage follower 129 that receives the control signal from the input port 127 and outputs a control signal to the output port 128; in some embodiments, the voltage follower 129 ensures that the adapter 126 has an extremely high input impedance, ensuring that the control signal received is unchanged by the adapter 126, while supplying the current necessary to maintain a substantially identical control signal to the output port 128 as required by the device receiving the signal from the output port 128. Where the adapter 126 is connected to the second driver 100b, the adapter 126 may draw power from the power supply 107 of the second driver 100b via a power supply input. In some embodiments, the adapter 126 has a transient voltage suppressor 130a across its input port 127. The adapter 126 may have a transient voltage suppressor 130b across its output port 128. Each of the transient voltage suppressors 130a-b may be as described above for a transient voltage suppressor 122 in reference to FIGS. 1B-1D. In some embodiments, some of the inputs and outputs of the adapter 126 are provided as headers; the headers may be adapted to connect to corresponding headers of the driver 100b. For instance, the adapter 126 may have a first three-pin header 131 having a return on the first pin, a control signal output on the second pin, and a power supply input on the third pin. The adapter 126 may have a second three-pin header 132 having a return to on the first pin and an unfiltered DC input on the second pin; the unfiltered DC input may not connect to anything in the adapter 126. The headers 131, 132 may be adapted to connect to the headers 119, 120 of the driver 100b; for instance, where the headers 119, 120 of the driver 100b are 91614-303 female headers as described above in connection with FIGS. 1A-1D, the headers 131, 132 of the adapter 126 may be 95293-101-03G headers, as manufactured by FCI Americas Technology, LLC of Carson City, Nev. In some embodiments, the control signals are very low power and may be conveyed using small-gauge wires. The connection between one driver and another may include isolation circuitry (not shown) that isolates the control signal from the power circuitry at each driver.

The driver 100a may receive the control signal from any device capable of outputting a control signal. The driver 100a may receive the control signal from a second driver. The driver 100a may receive the control signal by means of an adapter 126. In some embodiments, the driver 100a receives the control signal from a wireless receiver (not shown) that translates a wireless signal into a control output; the wireless receiver may be a digital receiver. In some embodiments, a user can transmit power level command wirelessly to the wireless receiver using a wireless transmitter (not shown); for instance, wireless receiver may be configured to receive a near-field communication signal from a mobile device, such as a smartphone, configured to send such a signal, and to translate the received signal into a control signal. A mobile application running on a mobile device may permit a user to interact with a user interface. The user interface may enable the user to select a power level for the driver 100a from a list of power levels, such as a drop-down list. In some embodiments, the driver 100a receives the control signal only from the modified AC decoder 200 as described below in connection with FIGS. 2A-2F. In other embodiments, the driver 100a may receive a control signal input from a circuit (not shown) that contains electronics to isolate the circuit from the driver 100a while the circuit generates the control signal.

In some embodiments, the driver 100a receives the control signal from a modified AC decoder 200. FIG. 2A illustrates one embodiment of a modified AC decoder 200. FIG. 2B is a schematic diagram of the circuit in an embodiment of a modified AC decoder 200. In some embodiments, the modified AC decoder 200 decodes a modified AC Line signal pattern to extract a control signal command for dimming control of the driver 100. In some embodiments, the modified AC decoder 200 receives the modified AC line signal pattern as an unfiltered rectified DC voltage signal from a driver 100 as described above in reference to FIGS. 1A-1F. The modified AC decoder 200 may operate by detecting a length of time, referred to herein as the "off time," during which the voltage of the AC voltage waveform is substantially equal to zero and interpreting that length of time and converting into a control signal. The off time may occur at or near the zero-crossing point of each half-cycle in the modified AC voltage waveform. The off time may be substantially centered about the zero-crossing point of the AC waveform; in other words, the portion of the off time preceding the zero-crossing point may be substantially equal to the portion of the off time following the zero-crossing point. In other embodiments, the portion of the off time preceding the zero-crossing point is slightly shorter or longer than the portion of the off time immediately following the zero-crossing point. The modified AC voltage waveform may be modified from a conventional sinusoidal waveform to a wave form that switches to 0 V for a certain amount of time before and after each zero-intercept in the sinusoidal waveform; the length of time the wave form is at 0 volts may be set by a modified AC encoder 300 as set forth in further detail below in connection with FIGS. 3A-3H.

In some embodiments, the modified AC decoder 200 includes a processor 201 that measures the length of the off time and translates that length into a pulse width modulated signal; the pulse width modulated signal may be constant-on "logic 1" signal when the off time length is of a value indicative of a control signal (e.g. the maximum command possible in a voltage control signal). The processor 201 may be any processor suitable for performing the algorithm described in reference to FIGS. 2A-2F, using the circuit elements described in reference to FIGS. 2A-2F. As a non-limiting example, the processor 201 may be a microprocessor. The processor 201 may be a microcontroller. The processor 201 may be a central processing unit (CPU). The processor 201 may be a neural net. The processor 201 may be any other kind of processor used in computing devices, including, for instance, a graphical processing unit (GPU). As a non-limiting example, the processor 201 may be a PIC12F1822 microprocessor, as manufactured by Microchip Technology, Inc., of Chandler, Ariz., or a similar product.

Figure 2A:
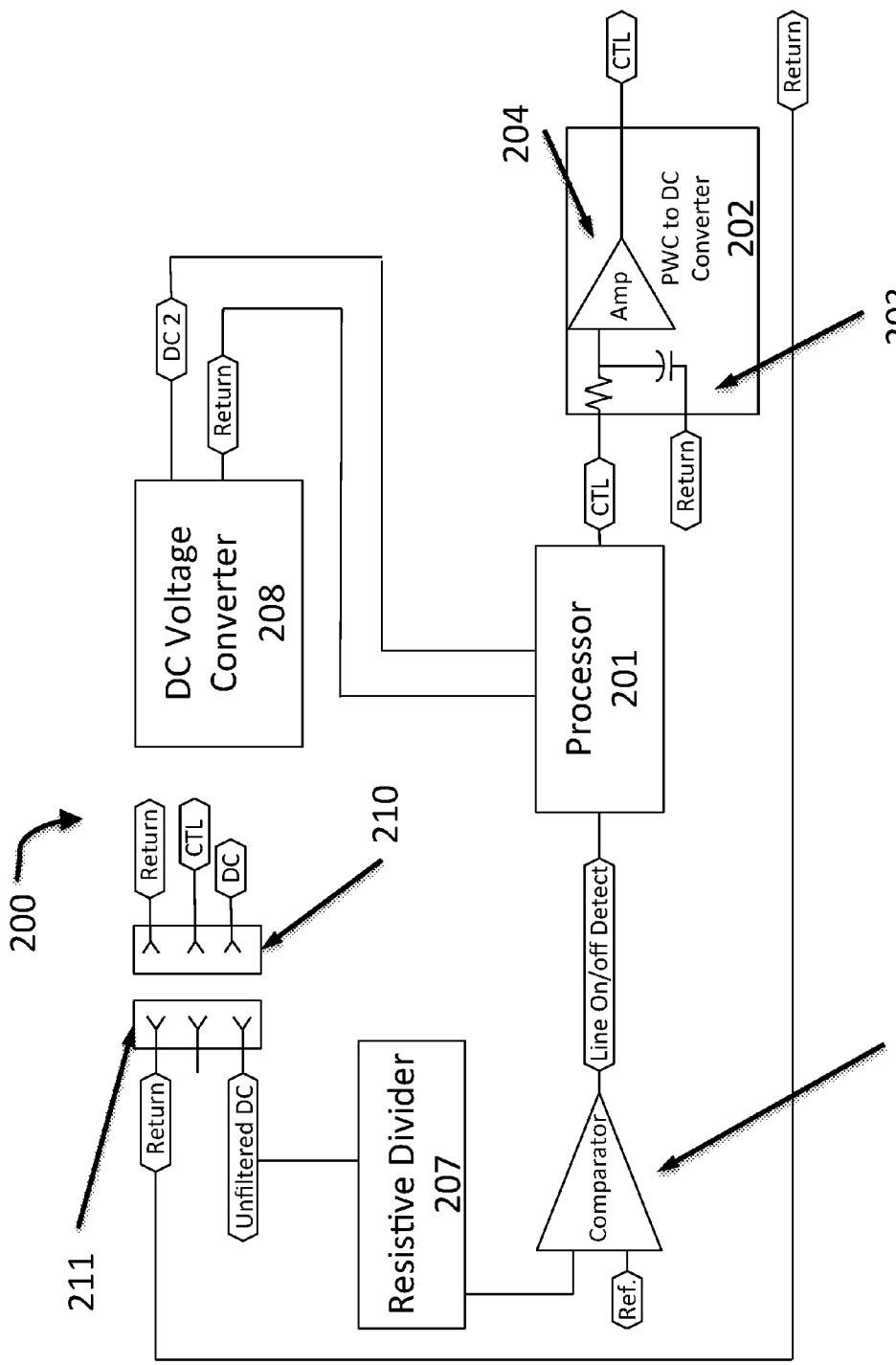
FIG. 2A is a block diagram depicting an embodiment of a modified AC decoder as described herein.
Figure 2B:
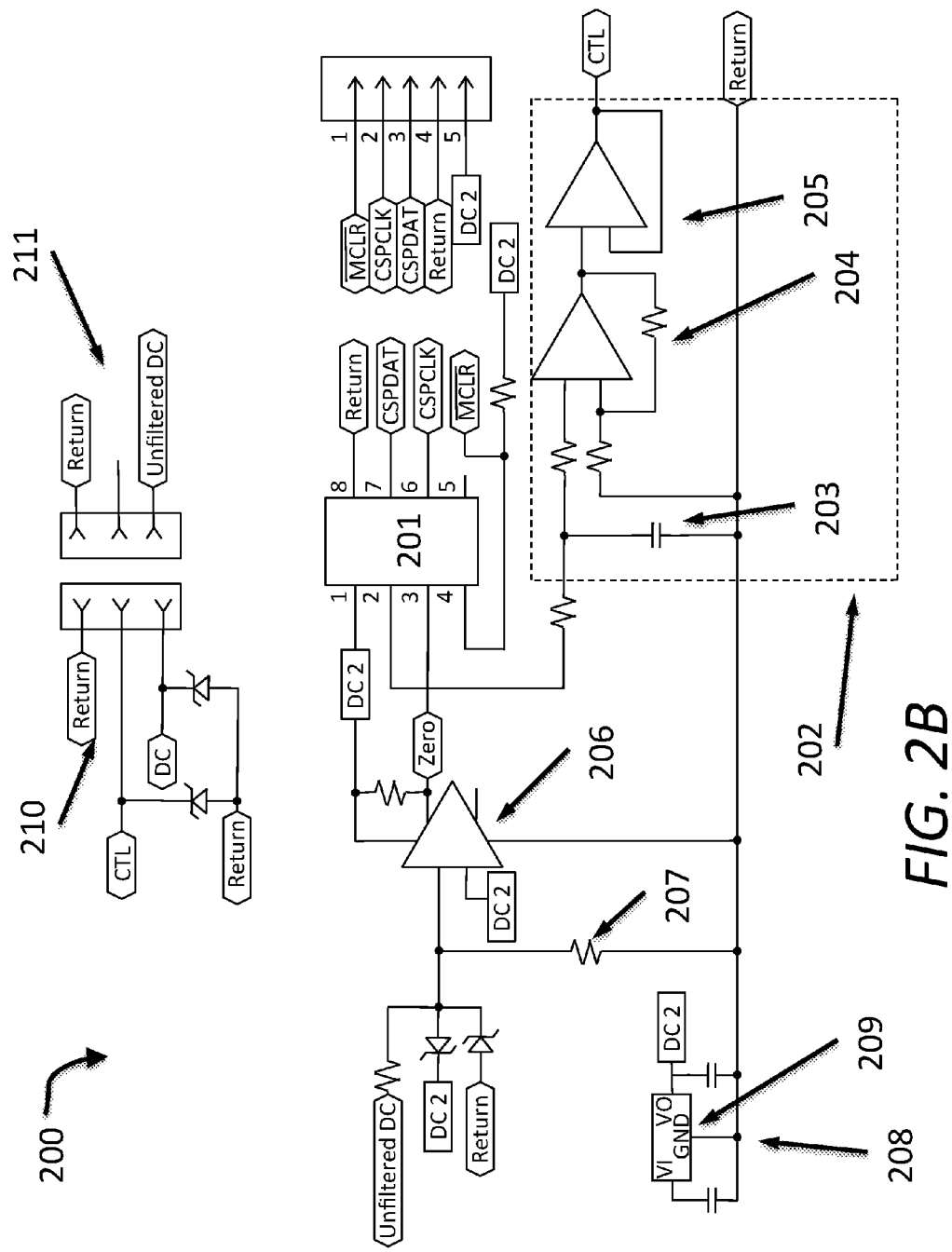
FIG. 2B is a schematic diagram depicting an embodiment of a modified AC decoder as described herein.
Figure 2C:
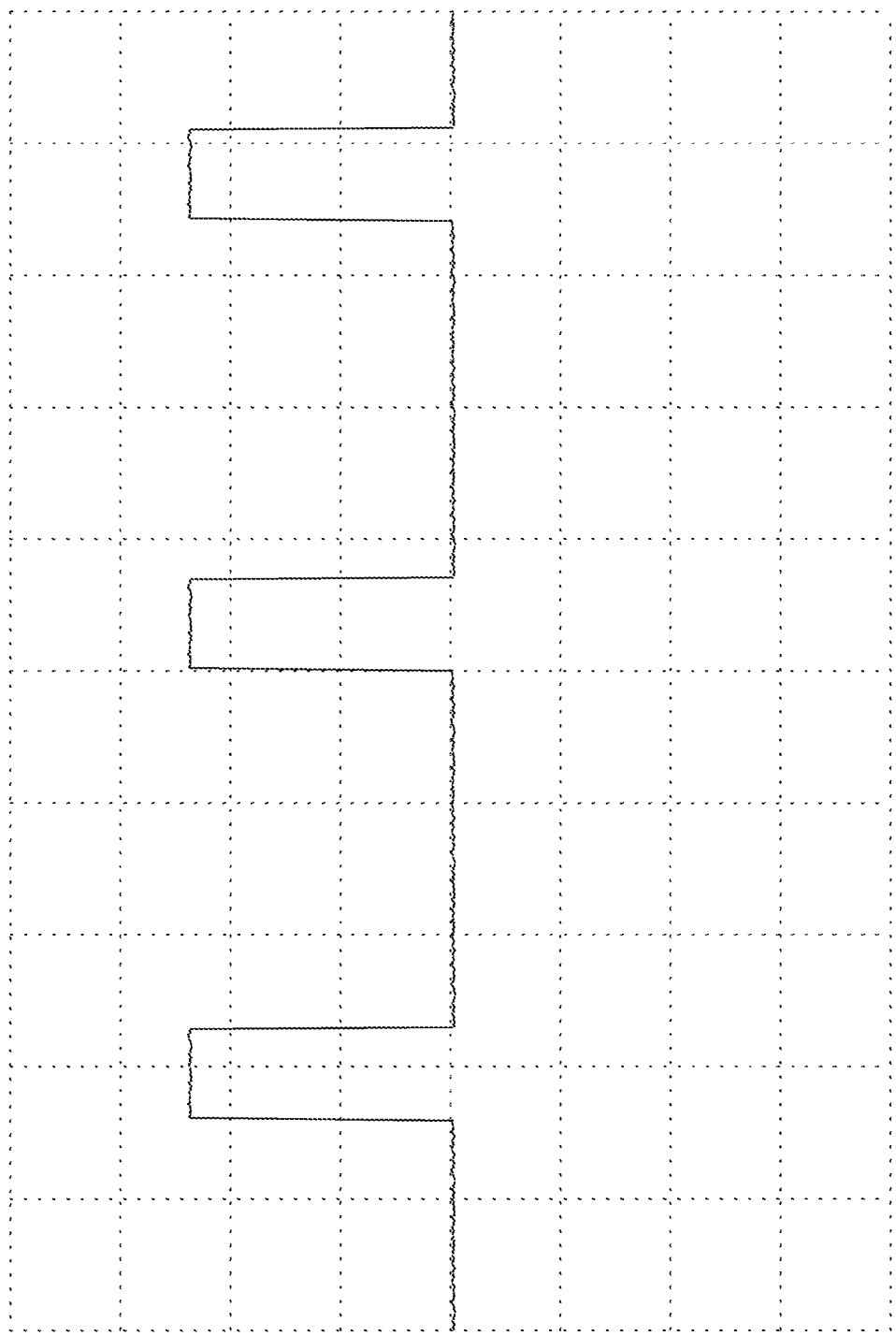
FIG. 2C is an oscilloscope display depicting an embodiment of a pulse-width modulated signal as described herein.
Figure 2D:
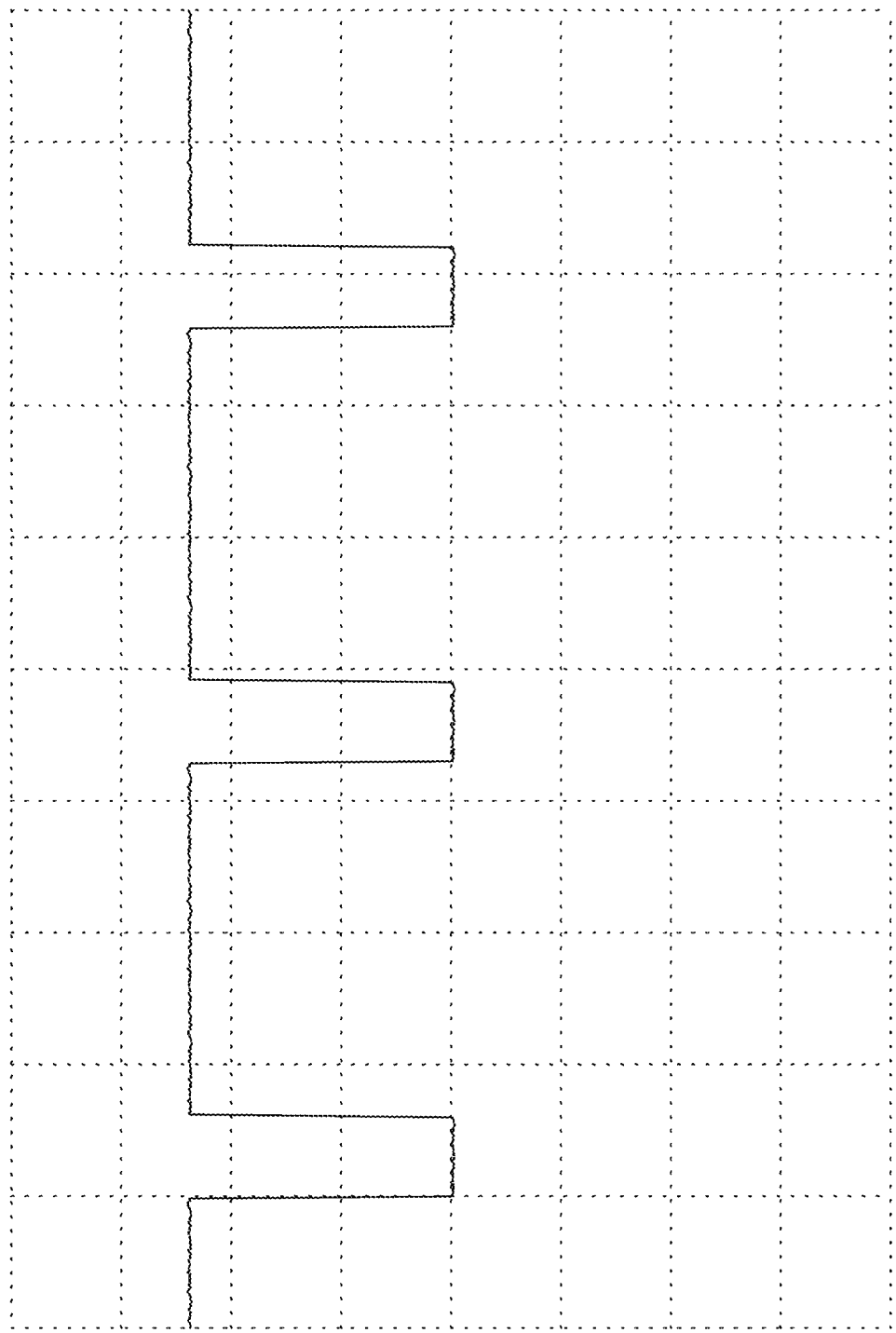
FIG. 2D is an oscilloscope display depicting an embodiment of a pulse-width modulated signal as described herein.

In some embodiments, the control signal output by the processor is a pulse width modulated signal. FIG. 2C shows the pulse width modulated output from the processor 201 associated with an off time corresponding to one control signal. FIG. 2D shows the pulse width modulated output from the processor 201 associated with another off time corresponding to another control signal. The pulse width modulated signal may correspond to a voltage control signal to which the pulse width modulated signal will be converted, for instance produced by a PMW to DC converter 202 as described below, as set forth in further detail below. As a non-limiting example, in some embodiments, when the processor 201 detects an off time of 1 millisecond it produces an output that results in a maximal voltage control signal (e.g. a signal of 10 VDC in a 0-10 VDC control signal); in some embodiments, when the processor 201 detects an off time of 2 milliseconds, the processor produces an output that results in a minimal signal, such as 0-VDC signal, or in a signal close to 0 VDC, in a 0-10 VDC signal range. Continuing the example, intermediate off time lengths between 1 and 2 milliseconds may correspond to voltage control output having an intermediate value between the minimum and maximum voltage levels; in some embodiments, the control signal output varies as a substantially linear function of the off time. The processor may receive a signal having one substantially constant voltage value per half-cycle indicating the off time (logic 0), and a second substantially constant voltage value per half-cycle indicating on time (logic 1).

In some embodiments, the processor 201 uses a running averaging software filter to provide smooth operation and to minimize flicker due to noise transients. In some embodiments, a running average filter replaces values of discrete data points, taken from a range centered on a selected data point, with the average of their values; as a result, the running average filter may sample the off times coming in and averages over a set of previous samples, such as the previous 31 samples, producing a number equal to the average over that set of previous samples. As a result, if the off time length changes from 1 to 1.5 ms for a transient period of time, such as might be produced by a random fluctuation of voltage in the AC input, the effect may be minimized, and the control signal output may change a negligible amount; if changed off time persists, average may shift to reflect the persistent change, resulting in a modified control signal output.

The modified AC decoder 200 may include a PMW to DC converter 202 that converts the pulse width modulated signal into a voltage control signal. The PMW to DC converter 202 may include an RC network 203 made up of at least one resistor and at least one capacitor, which averages the pulse width modulated signal to produce a constant voltage. In some embodiments, the constant voltage is at a level between 0 V and the "on" or "logic 1" voltage of the pulse width modulated signal; where the "on" voltage is equal to the maximum voltage of the voltage control signal, the constant voltage output by the RC network may be a value within the range of the voltage control signal. The processor may be programmed to produce the pulse necessary produce an average voltage equal to the voltage control signal to which the detected off time corresponds. The pulse width modulated signal example from FIG. 2C may result in a lower constant voltage output from the PWM to DC converter 202 than the pulse width modulated signal example from FIG. 2D. In embodiments where the "on" (logic 1) voltage of the pulse width is not equal to the maximum voltage control value, the PMW to DC converter 202 may include an amplifier 204 that maps the constant voltage to the voltage control range; e.g., the amplifier may map a constant voltage produced on a range between 0 and 5 VDC onto a 0-10 VDC range. For instance, where the processor 201 outputs pulses having an "on" voltage of approximately 5 VDC, or slightly less than 5 VDC, the amplifier 204 may have a gain of 2, or slightly more than 2, modifying the constant voltage to a voltage between 0 and 10 V. As shown in FIG. 2B, the amplifier 204 may be an operational amplifier with a negative feedback network causing the gain of the amplifier to produce a voltage such that the voltage produced by the feedback network at the inverting input equals the input at the inverting input of the operational amplifier; persons skilled in the art will be aware that the selection of the resistors making up the voltage divider permits the gain of the operational amplifier to be calibrated to any desired number up to the driving voltage of the amplifier. The amplifier 204 may be powered by the power supply 107 of a driver 100 as described above in reference to FIGS. 1A-1F. The PWM to DC converter 202 may include a voltage follower 205 that replicates the output of the converter 202; the voltage follower 205 may present a high input impedance to the converter 202, ensuring that the voltage control signal is not reduced by a load, such as a driver 100, connected to the modified AC decoder, while providing current necessary to maintain the control signal output at the output of the voltage follower 205. The voltage follower 205 may also be powered by the power supply 107 of a driver 100 as described above in connection with FIGS. 1A-1F. In some embodiments, the voltage output by the PWM to DC converter never reduces completely to 0; in some embodiments, where the control signal is a voltage control signal, the driver 100 may use the zero-current shutdown 109 to detect voltages near zero in the control signal and switch off the current from the a least one current regulator 105, as shown above in reference to FIGS. 1A-1F. In other embodiments, the driver 100 imitates a traditional triac dimmer in the sense that it reduces the light output to a very faint level but does not shut off.

The modified AC decoder 200 may include a comparator 206 that detects the beginning and end of the off time in the modified AC signal, and switches logic level at the output of the comparator 206 both at the beginning and at the end of the off time. As a non-limiting example, where the modified AC signal has been rectified by the rectifier 103 described above in connection with FIGS. 1A-1F, the comparator 206 may have an internal voltage threshold below which the comparator 206 switches output logic level to logic 0; for instance, the comparator may have an internal voltage threshold of 0.4 V, so that it outputs the logic 0 signal for a range of rectified voltage between 0.4 V and 0 V. In some embodiments, the switch in logic level by the comparator results in a clear signal to the processor 201 delineating the off time conveyed in the modified AC signal. The modified AC decoder 200 may also include a resistive divider 207 prior to the comparator 206. The resistive divider 207 may reduce the overall voltage of the modified AC waveform that is conveyed to the comparator 206. In some embodiments, the resistive divider 207 enables the comparator 206 to capture the true width of the off time, and to provide solid Logic 0 outputs to the processor 201. The resistive divider 207 may also enhance noise immunity for the modified AC decoder 200. FIGS. 2E and 2F illustrate oscilloscope outputs showing the rectified, modified AC signal, as divided down by the resistive divider 207, above the corresponding logic signal as output by the comparator 206, which is input to the processor 201; in some embodiments, the use of a comparator 206 and resistive divider 207 enhances the ability of the processor 201 to convert the off time delineations 230 in the rectified modified AC signal into crisp and reproducible logic 1 and 0 delineations 231. In some embodiments, a first resistive divider 207 may be used to convert a modified AC signal of a first amplitude to the required amplitude for the comparator 206, and a second resistive divider 207 may be used to convert a modified AC signal having a second amplitude to the required amplitude for the comparator 206; as a non-limiting example, one resistive divider may be installed for 120 V line voltage, a second resistive divider may replace the first resistive divider for 220 V line voltage, a third resistive divider may be swapped in for 277, and a fourth resistive divider may be installed for 480 V line voltage. In some embodiments, the only necessary step to make the modified AC decoder 200 function in a new line voltage is the installation of a new resistive divider 207. In some embodiments, the resistive divider 207 is adjustable; for instance, in some embodiments, the modified AC decoder 200 includes a switch (not shown) that allows a user to connect select a resistive divider 207 as necessary to make the modified AC decoder 200 function in particular line voltage. The switch may function as described above for a resistive divider switch 108 in reference to FIGS. 1A-1C; for instance, the resistive divider may include a potentiometer. The potentiometer may be controlled by a manual knob, with markings to indicate the position of the knob that places the potentiometer at the right resistance level to allow the modified AC decoder 207 to function with a given line voltage.

In some embodiments, the modified AC decoder 200 includes a DC voltage converter 208. The DC voltage converter 208 may convert the DC power received from the power supply 107 of a driver 100 as described above in reference to FIGS. 1A-1F to a different DC voltage as required for one or more components of the modified AC decoder 200. The DC voltage converter 208 may include a voltage reference 209. For instance, in some embodiments, the processor 201 has an operating voltage of 5 VDC, rather than 10 VDC; the DC voltage converter 208 may include a voltage reference 209 that outputs 5 VDC. As a non-limiting example, the voltage reference 209 may be a MAX6105 5VDC reference, as manufactured by Maxim Integrated, Inc. of San Jose, Calif. In some embodiments, some components are powered by the output of the DC voltage converter 208, while others are powered by the power supply 107 input; as a non-limiting example, the processor 201 and comparator 206 may be powered by the DC voltage converter 208, while the components of the PWM to DC converter 202 may be powered by the power supply voltage.

The modified AC decoder 200 may collect one or more of its input and output terminals into headers for connection to other devices. As a non-limiting example, the modified AC decoder 200 may have a first three-pin header 210 having a return on the first pin, a control signal output on the second pin, and a power supply input on the third pin. The modified AC decoder 200 may have a second three-pin header 211 having a return on the first pin and an unfiltered DC input on the second pin. The headers 210, 211 may be adapted to connect to the headers 119, 120 of the driver 100b; for instance, where the headers 119, 120 of the driver 100b are 91614-303G headers as described above in connection with FIGS. 1A-1D, the headers 210, 211 of the modified AC decoder 200 may be 95293-101-03G headers, as manufactured by FCI Americas Technology, LLC of Carson City, Nev.

Figure 2E:
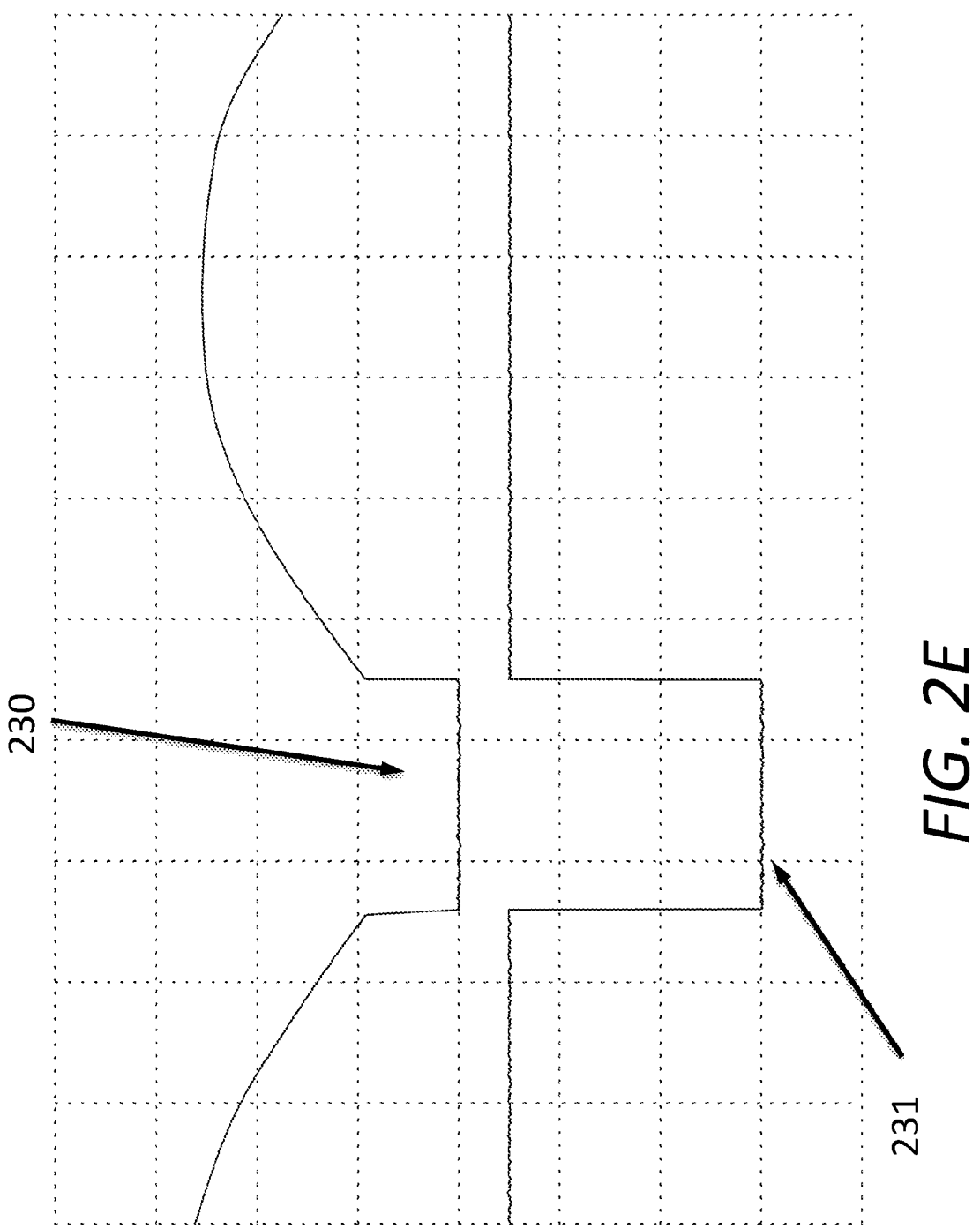
FIG. 2E is an oscilloscope display depicting an embodiment of a pulse-width modulated signal matched up with a corresponding rectified modified AC waveform as described herein.
Figure 2F:
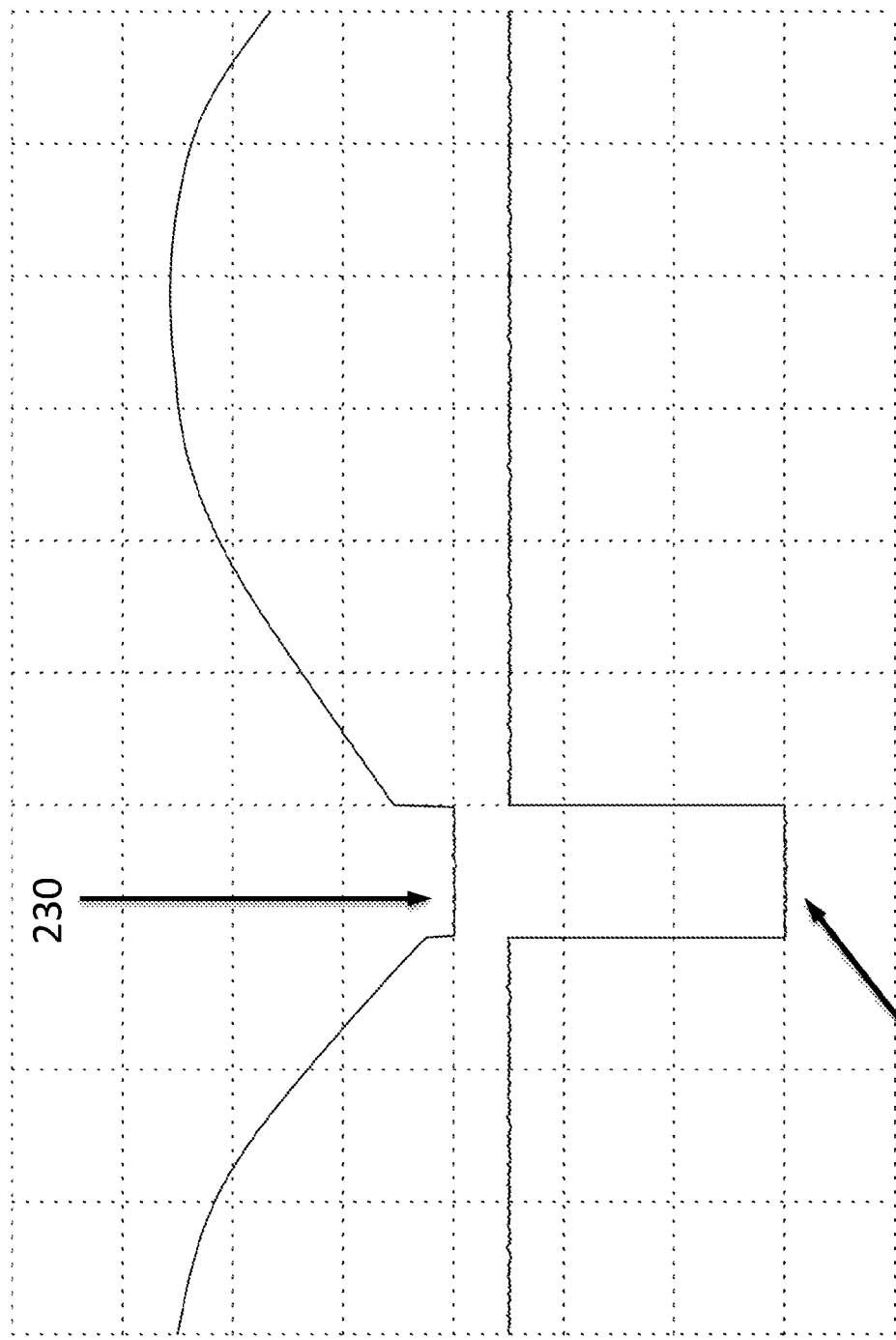
FIG. 2F is an oscilloscope display depicting an embodiment of a pulse-width modulated signal matched up with a corresponding rectified modified AC waveform as described herein.
Figure 3A:
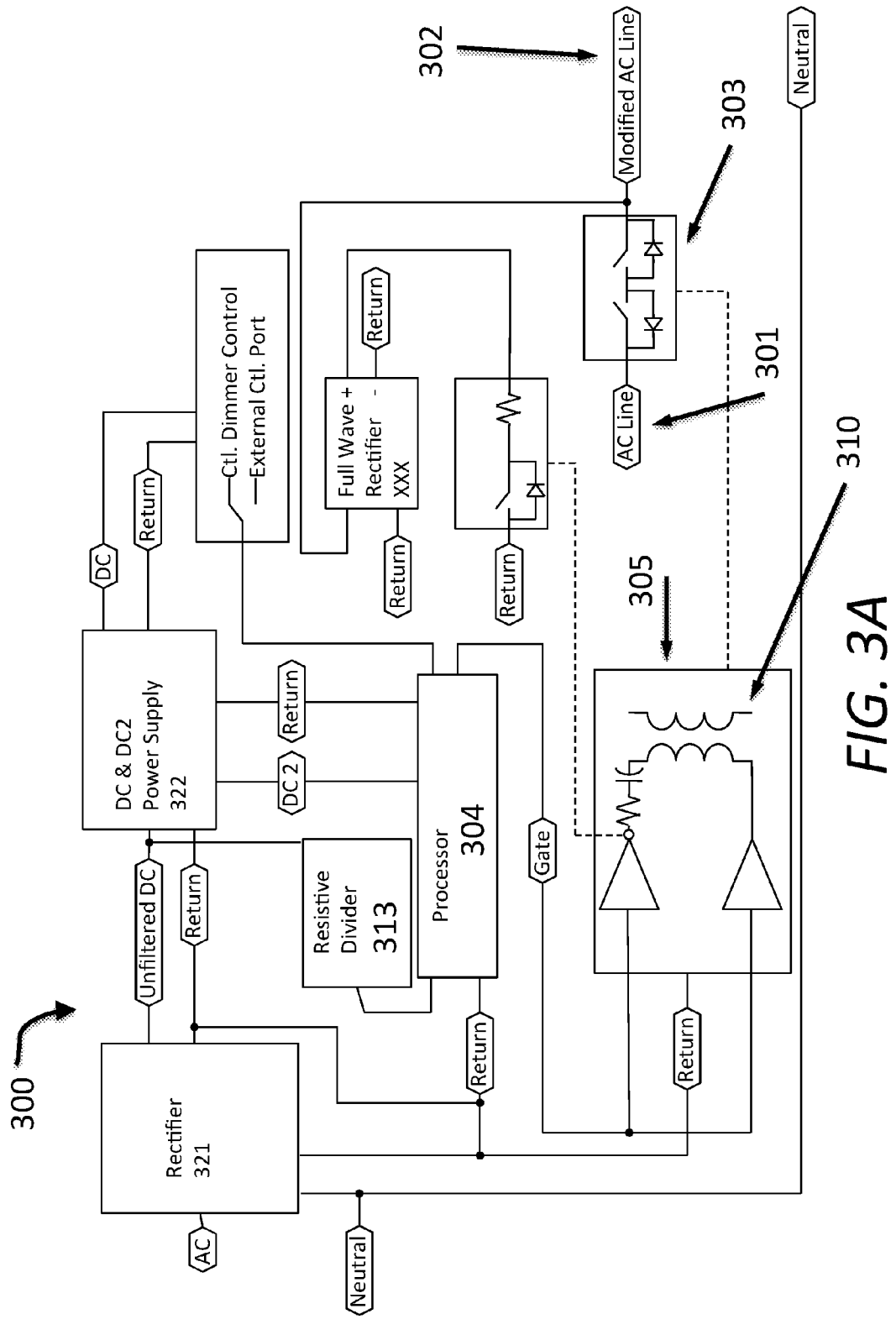
FIG. 3A is a block diagram depicting an embodiment of a modified AC encoder as described herein.

FIG. 3A illustrates a block diagram of a modified AC encoder 300. In some embodiments, the modified AC encoder 300 converts an AC signal received at an input port 301 into a modified AC signal that contains an off time as described above in reference to FIGS. 2A-2F, which output at an output port 302. In some embodiments, the modified AC signal has one off time per half-cycle. The off time may be a period of time during which the voltage of the modified AC signal is substantially zero. In some embodiments, the length of the off time corresponds to the information the modified AC encoder 300 is transmitting. The off time may be centered around the zero-crossing point of the substantially sinusoidal waveform of the modified AC signal. In some embodiments, centering the off time around the zero crossing point places the interruption in power that the off time creates at the point in the AC waveform where the power being transmitted is normally minimal; as a result, the modified AC signal may transmit an essentially undiminished amount of power to appliances driven by the modified AC signal. Furthermore, the placement of the off time around the zero crossing may minimize voltage transients caused by the off time, in contrast to the AC signals produced by conventional dimming devices such as triac dimmers.

Figure 3B:
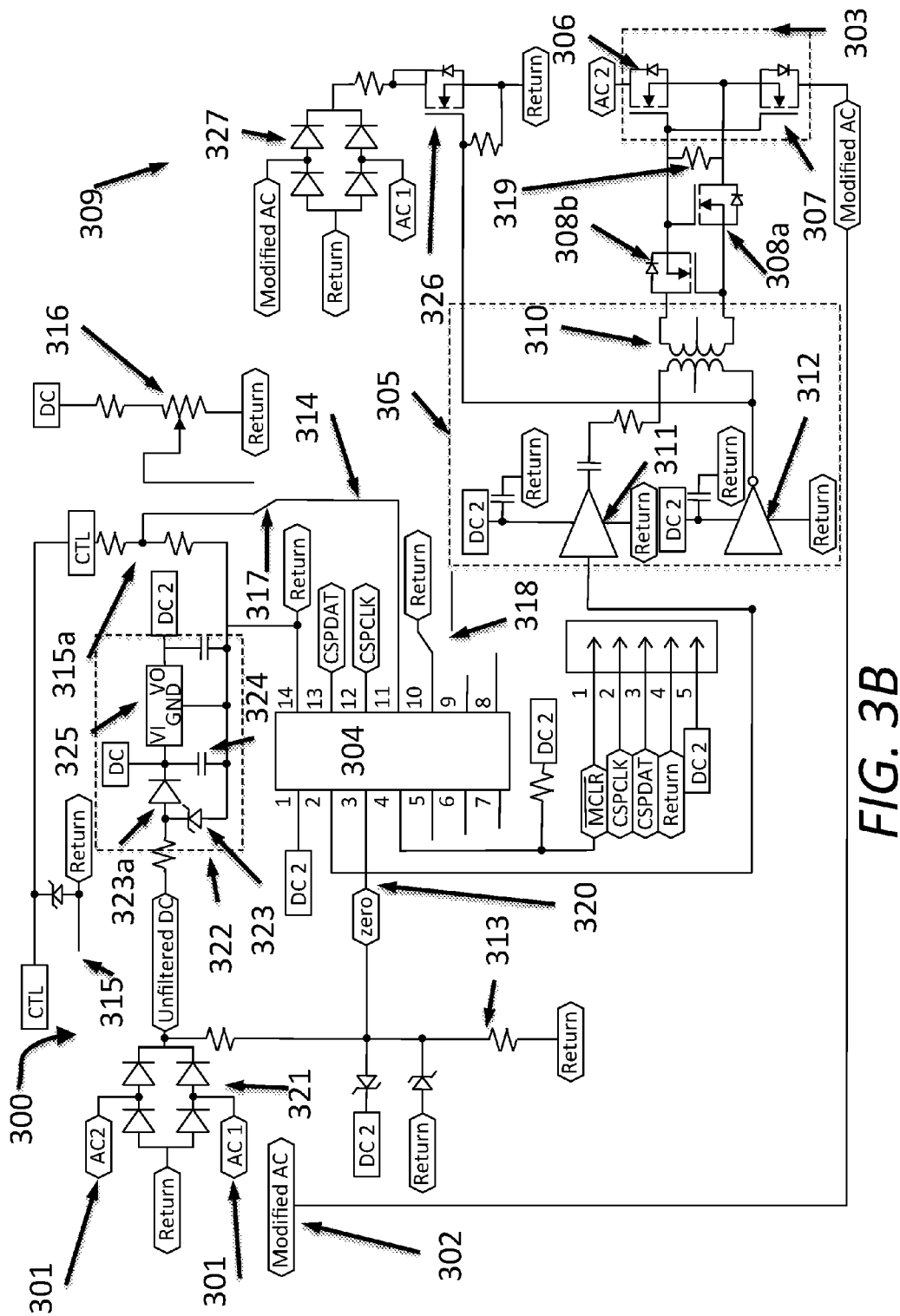
FIG. 3B is a schematic diagram depicting an embodiment of a modified AC encoder as described herein.

In some embodiments, the modified AC encoder 300 includes a bipolar switch 303 that switches off during the off time, preventing conduction of the AC signal, and switches on at other times, permitting the AC signal to transmit through the bipolar switch 303. In some embodiments, the bipolar switch 303 is controlled by a processor 304. The processor 304 may control the bipolar switch 303 by way of a gate drive circuit 305. In some embodiments, as shown in FIG. 3B, the bipolar switch 303 includes two transistors; in some embodiments, the bipolar switch 303 includes a first MOSFET 306 and a second MOSFET 307, the source of the first MOSFET 306 electrically connected to the source of the second MOSFET 307; the gate of the first MOSFET 306 may be electrically connected to the gate of the second MOSFET 307. In one embodiment, the drain of the first MOSFET 306 points in the opposite direction from the drain of the second MOSFET 307; as a result, during one half-cycle, the AC waveform may be conducted through the first MOSFET 306, if the first MOSFET 306 is on, and the freewheeling diode of the second MOSFET 307, and during the opposite half-cycle, the AC waveform may be conducted through the second MOSFET 307 and the freewheeling diode of the first MOSFET 306. As a non-limiting example, the first MOSFET 306 may be a IXFT24N80P, as produced by FCI Americas Technology, LLC of Carson City, Nev., or a similar product. In some embodiments, the second MOSFET is any MOSFET suitable for use as the first MOSFET. Although the first MOSFET 306 and second MOSFET 307 are described for the purposes of simplicity, any voltage-controlled transistor that can hold capacitance at its point of control (i.e. its gate, base, or similar component) essentially constantly for at least one half-cycle as deployed in the disclosed modified AC encoder 300 may be used for the first MOSFET 306 or the second MOSFET 307. The AC line input 301 may enter the drain of the first MOSFET 306, and the modified AC output 302 may exit the drain of the second MOSFET 307.

The first MOSFET 306 and second MOSFET 307 may switch on and off together in response to voltage pulse signals transmitted by the gate drive circuit 305; the voltage signals may correspond to the beginning and end of the off times calculated by the processor 304 as set forth in further detail below. When the first MOSFET 306 is conducting, the second MOSFET 307 may permit conduction through its freewheeling diode 307a. Likewise, when the second MOSFET 307 is conducting, the first MOSFET 306 may permit conduction through the freewheeling diode 306a of the first MOSFET 306. In some embodiments, the original AC waveform conducts through the bipolar switch 303 essentially unchanged except during the off time. When the first MOSFET 306 and second MOSFET 307 receive a positive voltage pulse from the gate drive circuit 305, the gate capacitance of each of the first MOSFET 306 and second MOSFET 307 charges up, causing the first MOSFET 306 and second MOSFET 307 to turn on and to remain on and conducting until the gate capacitances have discharged, either due to receiving a negative voltage pulse, due to a gradual discharge through a resistor in the absence of gate pulses, as described in further detail below. In some embodiments, the first MOSFET 306 and second MOSFET 307 receive a positive voltage pulse at the end of a programmed off time, causing the one of the first MOSFET 306 and second MOSFET 307 and the freewheeling diode of the other of the first MOSFET 306 and second MOSFET 307 to conduct the AC waveform essentially unmodified. When the first MOSFET 306 and second MOSFET 307 receive a negative voltage pulse, the negative pulse causes the gate capacitances of the first MOSFET 306 and second MOSFET 307 receiving the pulse to discharge, and the first MOSFET 306 and second MOSFET 307 shut off; in some embodiments, the first MOSFET 306 and second MOSFET 307 have been conducting the largely unmodified AC waveform during a programmed on time, and receive the negative pulse at the beginning of a programmed off time, shutting off the AC waveform until the first MOSFET 306 and second MOSFET 307 are activated by a new positive voltage pulse from the gate drive circuit 305 to allow the AC waveform, to resume transmission through the bipolar switch 303.

In some embodiments, the a pair of small switching transistors 308*a-b* prevents the gates of the first MOSFET 306 and second MOSFET 307 from discharging too quickly, while directing the pulses to the gates of the first MOSFET 307 and the second MOSFET 307. The switching transistors 308*a-b* may be MOSFETs. As a non-limiting example, the switching transistors 308*a-b* may be IRML2803 MOSFETs as produced by International Rectifier Corporation of El Segundo, Calif., or a similar product. In some embodiments, when the gate drive circuit 305 directs a pulse of a first polarity toward the switching transistors 308*a-b*, one switching transistor 308*a* conducts the pulse through its freewheeling diode; the pulse switches on the gate of the other transistor 308*b*, causing it to conduct the pulse as well, completing the circuit. When a pulse of the opposite polarity issues from the gate drive circuit 305, the freewheeling diode of the other transistor 308*b* conducts the pulse while the pulse opens the gate of the first transistor 308*a* to conduct the pulse as well. Between pulses, both switching transistors 308*a-b* are off, so that the gate capacitances of the first MOSFET 306 and second MOSFET 307 do not discharge through the switching transistors 308*a-b*. In some embodiments, a discharge circuit 309 drains parasitic capacitances from the first MOSFET 306 and second MOSFET 307 during the off times, as described in further detail below in connection with FIG. 3B.

Figure 3C:
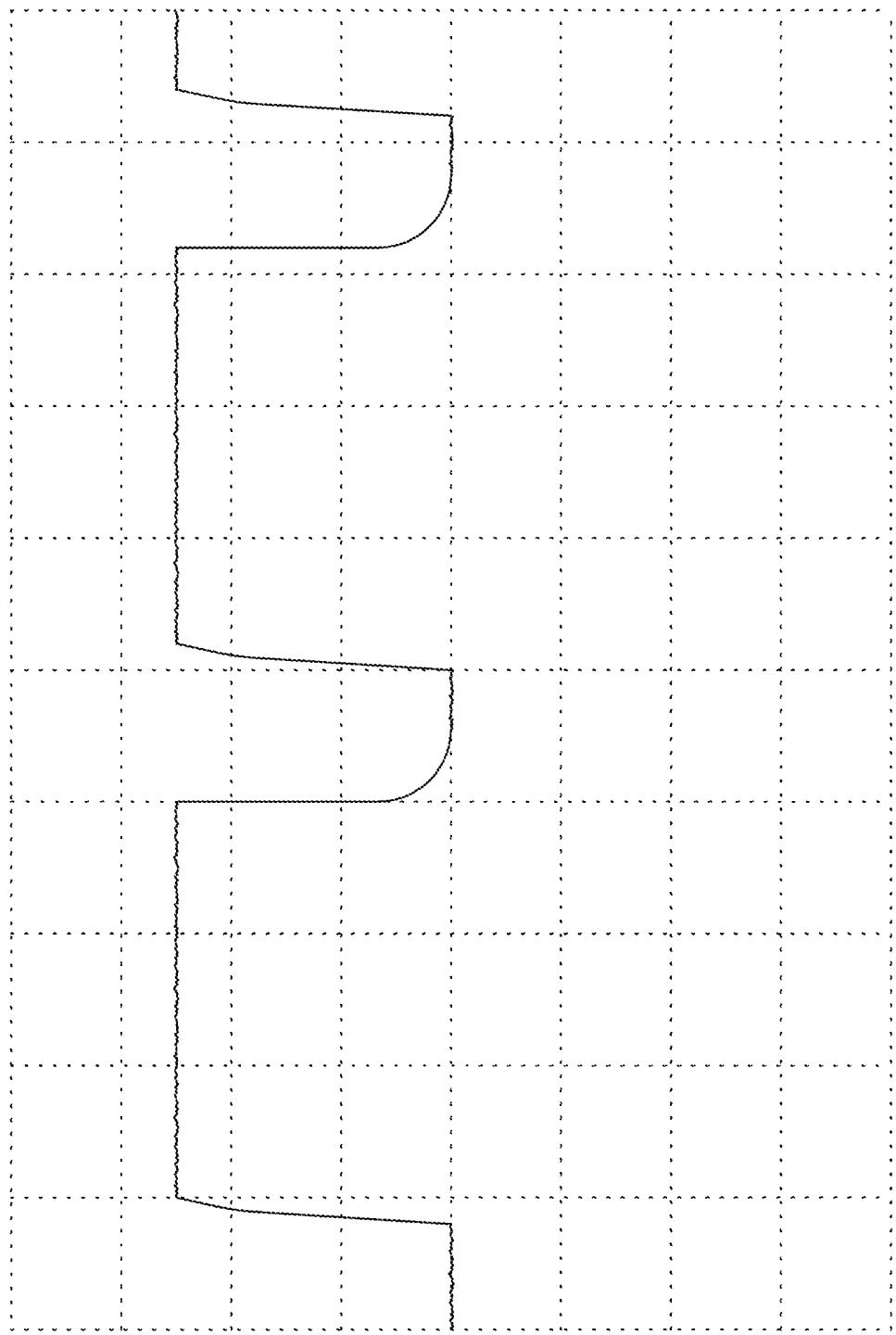
FIG. 3C is an oscilloscope display depicting an embodiment of a gate driving waveform as described herein.
Figure 3D:
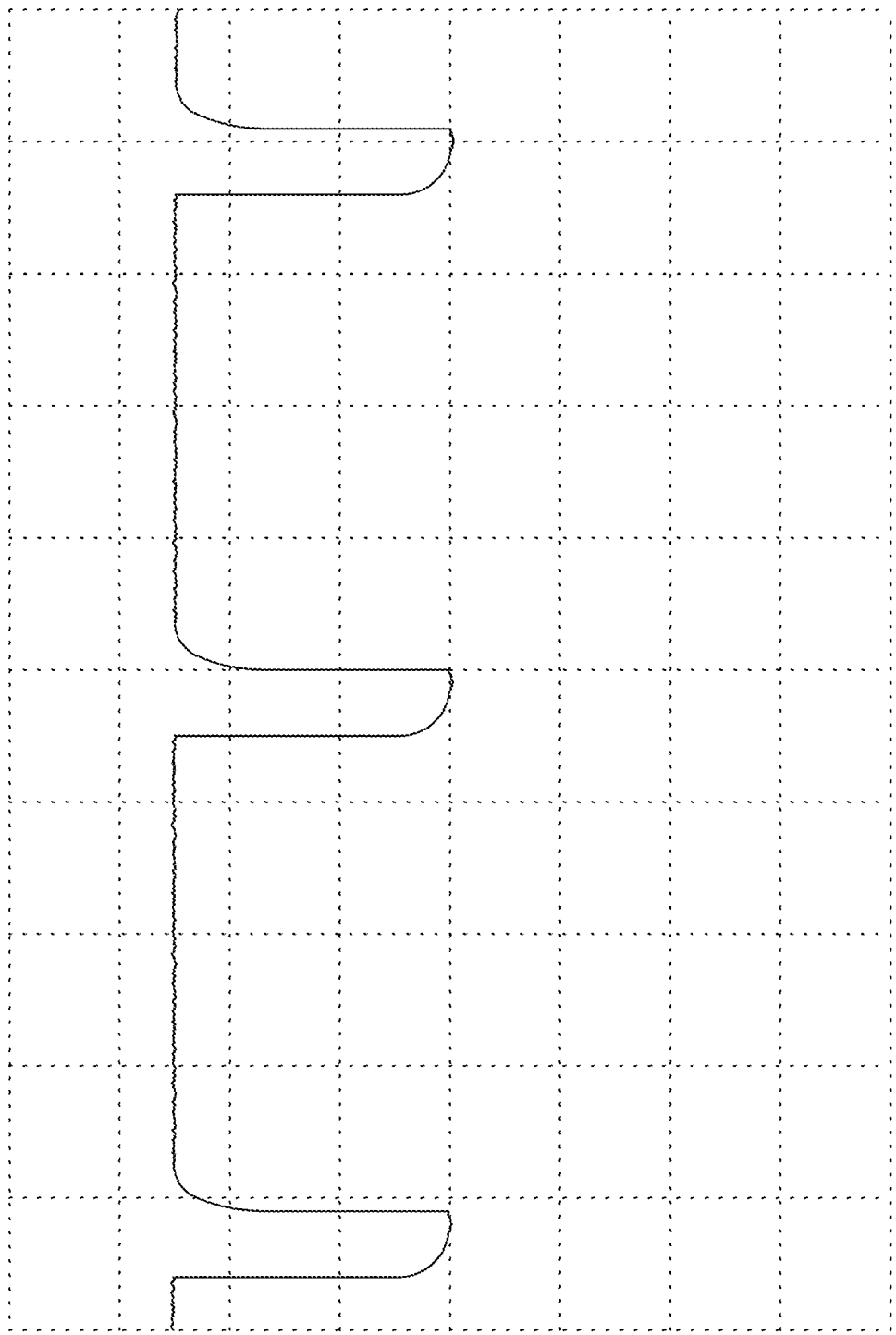
FIG. 3D is an oscilloscope display depicting an embodiment of a gate driving waveform as described herein.
Figure 3E:
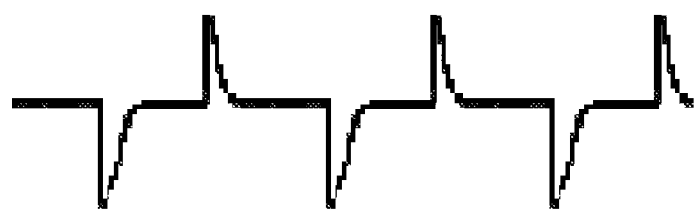
FIG. 3E is a diagram depicting an embodiment transformer output based on a gate drive signal.

In some embodiments, the gate drive circuit generates the voltage pulses by feeding a substantially square wave into a transformer 310. As a non-limiting example, the transformer may be a 78253/35JC transformer manufactured by Murata Power Solutions, Inc. of Mansfield, Mass., or a similar product. In some embodiments, the transformer 310 is designed to saturate very quickly, resulting in only brief pulses of opposite polarities occurring at the 0-1 and 1-0 transition points. FIGS. 3C and 3D illustrate two exemplary square waves as output by the processor 304. FIG. 3E illustrates an exemplary form of the transformer output; positive and negative square wave inputs cause a very brief positive or negative spike in output voltage, respectively, which almost immediately returns to zero as the transformer saturates. The square wave in FIG. 3C may correspond to an off time of approximately 2 milliseconds, while the square wave in FIG. 3D may correspond to an off time of approximately 1 millisecond. In some embodiments, the square wave is provided to one terminal of the transformer primary 310 by a non-inverting gate driver 311, such as a non-inverting MOSFET driver, and to the second terminal of the transformer primary 310 by an inverting gate driver 312, such as an inverting MOSFET driver. As a non-limiting example, the non-inverting gate driver 311 may be a TPS2829 non-inverting high-speed MOSFET driver, as manufactured by Texas Instruments Incorporated of Dallas, Tex., or a similar product. As a non-limiting example, the inverting gate driver 311 may be a TPS2828 inverting high-speed MOSFET driver, as manufactured by Texas Instruments Incorporated of Dallas, Tex., or a similar product. In some embodiments, both the inverting gate driver 312 and the non-inverting gate driver 311 generate their square waveforms in response to a square wave input from the processor 304. In some embodiments, the square wave output by the processor 304 has peaks at logic 1 and troughs at logic 0; the logic 1 portions of the processor 304 square wave output may be provided to the transformer primary by the non-inverting gate 311, while the logic 0 portions may be provided as a negative logic 1 pulse to the transformer primary, so that the transformer primary 310 is receiving a square wave that has twice the amplitude of the processor output, and that reverses polarity.

The processor 304 may be any suitable processor for performing the algorithm described in reference to FIGS. 3A-3H, using the components described in reference to FIGS. 3A-3H. The processor 304 may be any processor 201 as described above in reference to FIGS. 2A-2F. As a non-limiting example, the processor 304 may be a microprocessor. The processor 304 may be a microcontroller. The processor 304 may be a central processing unit (CPU). The processor 304 may be a neural net. The processor 304 may be any other kind of processor used in computing devices, including, for instance, a graphical processing unit (GPU). As a non-limiting example the processor 304 may be a PIC16F1823 8-bit microcontroller, as manufactured by Microchip Technology, Inc., of Chandler, Ariz., or a similar product.

In some embodiments, the processor 304 receives the rectified waveform of the AC line voltage and a control signal, calculates an off time corresponding to the control signal, and outputs a signal to the gate drive circuit 305 directing the gate drive circuit 305 to cause the bipolar switch 303 to switch off the modified AC voltage during the calculated off times. The control signal may be any control signal described above in connection with FIGS. 1A-2F. In some embodiments, the processor 304 places the off times near the zero-crossing point of the AC waveform. As noted above, placing the off times near the zero-crossing point of the AC waveform may eliminate voltage transients linked to load current interruption. In addition, loads being driven by the modified AC wave may receive negligible power during the portions of the AC waveform near to the zero-crossing points; for instance, where the load is an LED mesh, conduction may only occur near the peaks of the AC Line voltage waveform, causing modification to the waveform near the zero-crossing point to have essentially no effect on the performance of the LED mesh.

In some embodiments, the processor 304 determines the location of the zero voltage point in the AC input line. The processor 304 may determine the zero voltage point by calculating the instantaneous voltage as a function of time, using the frequency and peak voltage of the AC waveform, using the sinusoidal wave equation $V_{instantaneous} = V_{peak} \sin(\omega t)$, where $\omega$ is the angular frequency of the AC waveform. The processor 304 may determine an initial voltage by sampling the AC waveform instantaneous voltage. The peak voltage and angular frequency of the AC waveform may be stored in memory accessible to the processor 304. In other embodiments, the processor 304 detects the 0-crossing point by detecting a point at which the AC waveform falls to a logic zero beneath a threshold voltage; for a given waveform and threshold voltage, the processor 304 may be programmed to detect how soon before the actual zero-crossing point the logic 0 detection takes place. In some embodiments, the processor combines the logic 0 detection with the calculation of the zero-crossing point to determine how far in advance of the zero-crossing point the logic 0 detection takes place. The modified AC encoder 300 may include a resistive divider 313 that divides the voltage of the AC waveform down; the instantaneous voltage of the divided AC waveform may be calculated as $V_{instantaneous}$=Divider Ratio*$V_{peak}$sin(ωt), where the divider ratio is the fraction of the instantaneous voltage provided to the processor 304 by the resistive divider 313. In some embodiments, the smaller the divider ratio is, the closer to the actual zero-crossing point the logic 0 detection will take place, for a given threshold voltage. In some embodiments, the resistive divider 313 has at least one resistor selected to cause the logic 0 detection point to occur slightly more than 1 millisecond prior to the actual zero crossing point; for instance, a resistive divider creating a divider ratio of 1/51 may cause the zero detection point to occur slightly more than 1 millisecond prior to the zero crossing point. A different resistive divider may be selected to cause a logic 0 detection slightly more than 1 millisecond before the zero crossing point for a different AC line voltage such as a 230 V line or a 480 V line. In some embodiments, the resistive divider 313 is adjustable; for instance, a switch or potentiometer (not shown) may allow a user to calibrate the resistive divider as necessary to allow the modified AC encoder 300 to function with a given line voltage, as described above in reference to FIGS. 2A-2F.

Figure 3F:
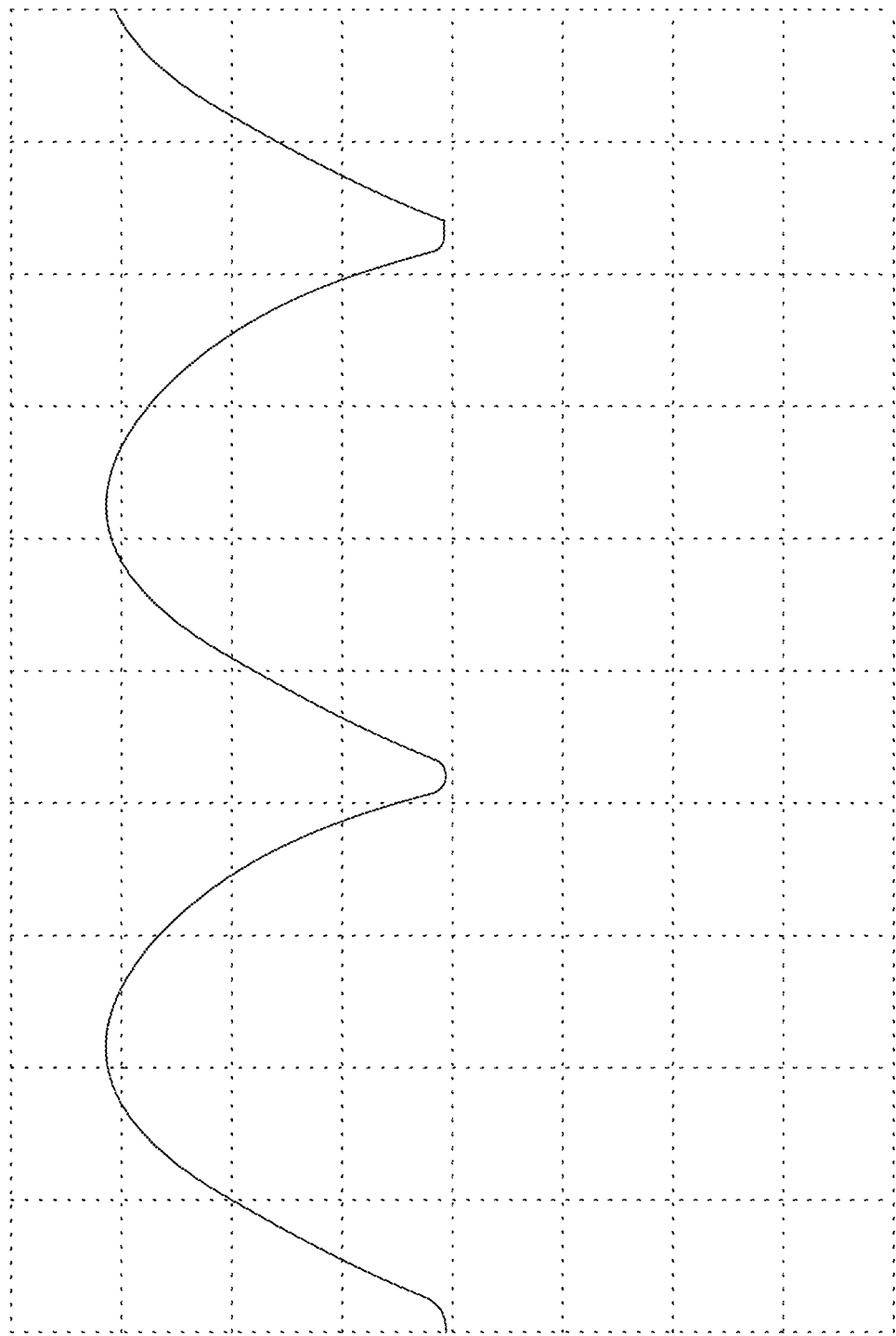
FIG. 3F is an oscilloscope display depicting an embodiment of an unmodified, rectified AC waveform as described herein.
Figure 3G:
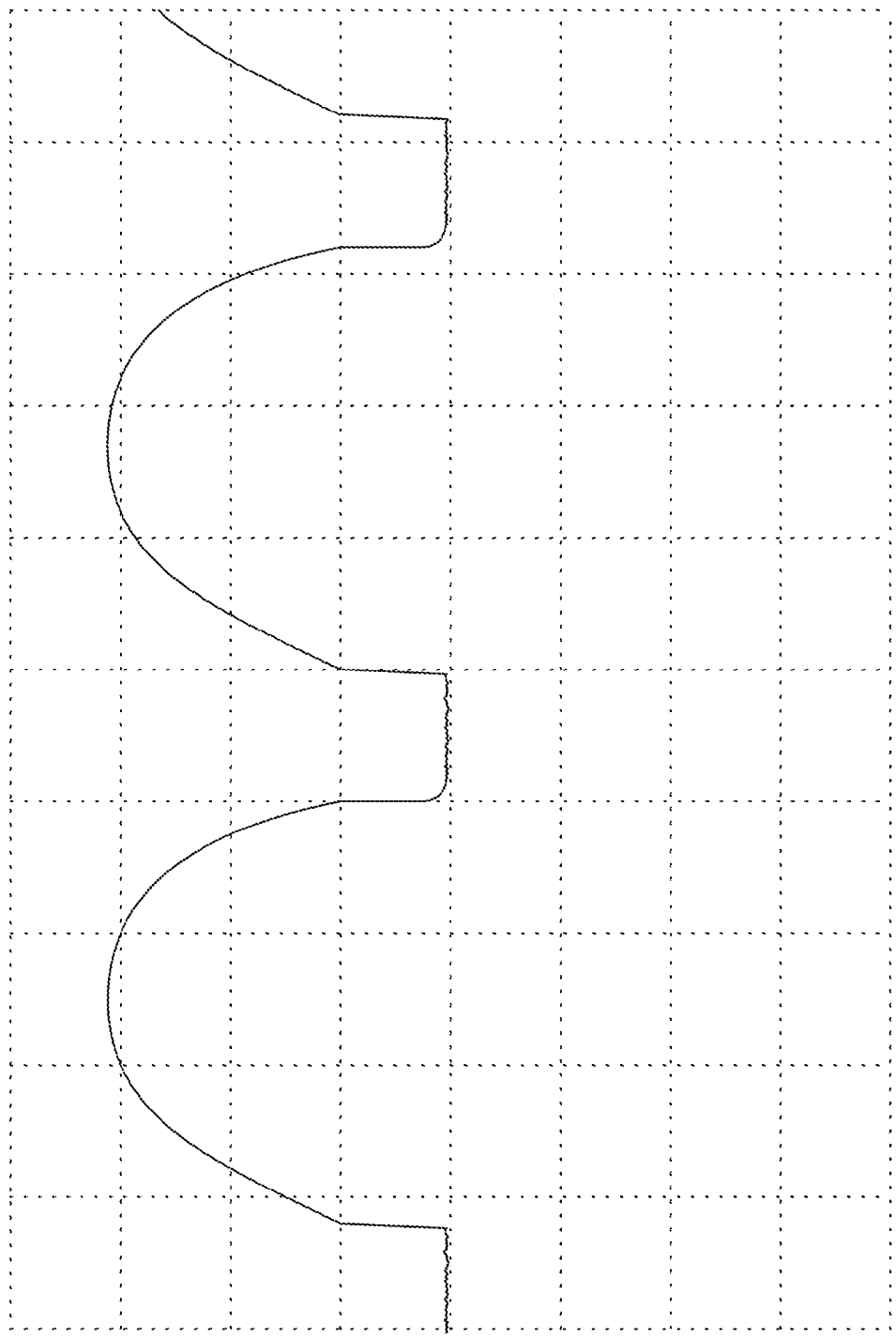
FIG. 3G is an oscilloscope display depicting an embodiment of a modified, rectified AC waveform as described herein.
Figure 3H:
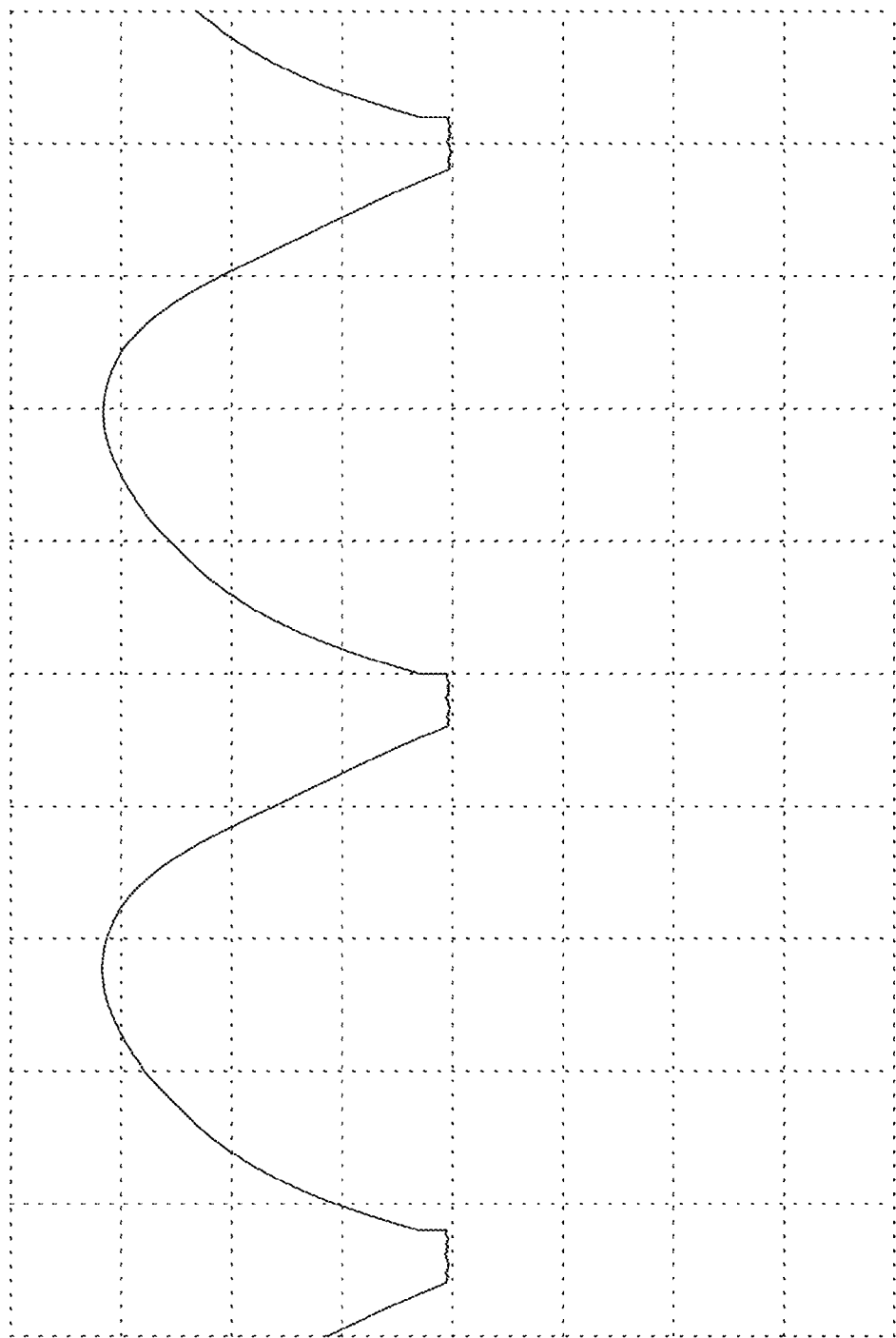
FIG. 3H is an oscilloscope display depicting an embodiment of a modified, rectified AC waveform as described herein.
Figure 31:
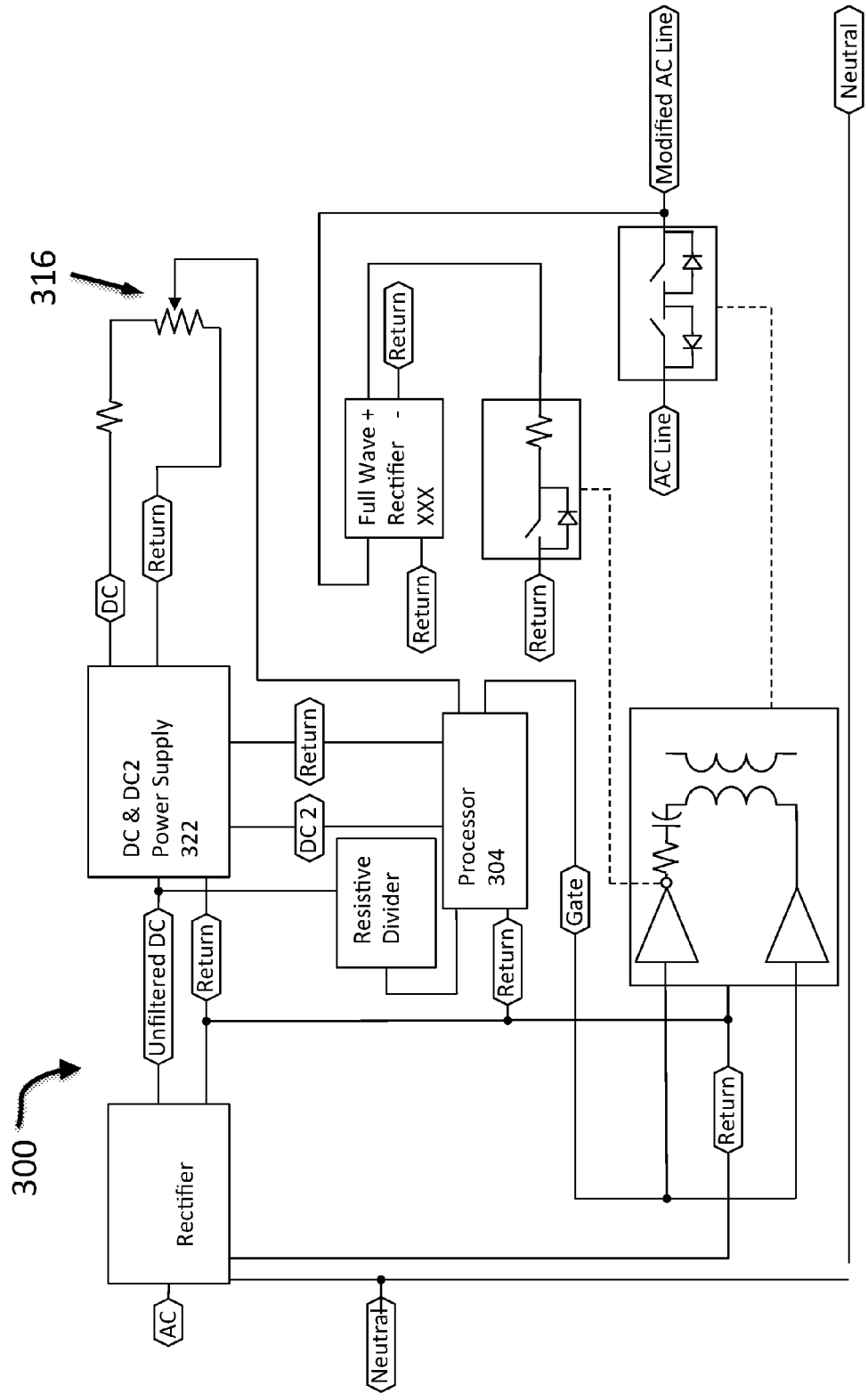

In some embodiments, the resistive divider 313 is selected to cause the logic 0 detection point to occur a known number of microseconds prior to the zero-crossing point. The processor 304 may be configured to compute a linear function of the control signal to determine how many microseconds after the logic 0 detection point to begin the off time; in some embodiments, the processor 304 calculates a second linear function of the control signal to determine how many microseconds after the logic 0 detection to end the off time. The processor 304 may calculate the off time by setting a beginning and an end for the off time, relative to the determined zero crossing point, as described above. In some embodiments, the time from the beginning to the zero crossing point is substantially the same as the time from the zero crossing point to the end time, so that the off time is substantially centered around the zero crossing point; the "OFF" period may move slightly left or right of center with AC Line voltage variations, but not enough to disrupt correct operation. In some embodiments, the duration of the off time, which is the time from the beginning to the end of the off time, is at least one millisecond long; in some embodiments, a minimum off time of 1 millisecond insures that the "ON-to-OFF" and "OFF-to-ON" transitions are easily detectable by devices, such as the modified AC decoder 200, that interpret the off time as a signal, as described in further detail above in connection with FIGS. 2A-2F. In some embodiments, the off time is at most 2 milliseconds; a maximum time of 2 milliseconds may ensure a minimal disruption of the modified AC waveform. In some embodiments, the processor 304 maps a control signal to the calculated off time. As a non-limiting example, where the control signal is a 0-10 VDC signal, the mapping function may be a linear function whereby a 0 VDC control signal causes the processor 304 to output an off time 2 milliseconds in duration (approximately 1 millisecond on either side of the zero crossing point), a 5 VDC control signal causes the processor to output a 1.5 millisecond off time (approximately 0.75 milliseconds on either side of the zero crossing point), and a 10 VDC control signal causes the processor 304 to output a 1-millisecond off time (approximately 0.5 milliseconds on either side of the zero crossing point); values between those three 0-10 VDC values may cause the processor 304 to output off times between the three off time values as determined by a linear function accomplishing the three mappings described. In some embodiments, an "off" input to the processor, provided by an on-off switch, as described in further detail below in connection with FIG. 3B, causes the processor to stop driving the gate driver, leading the bipolar switch 303 to shut off the modified AC line, cutting power to downstream devices, as described above in reference to FIGS. 3A-3B. FIG. 3F illustrates an unmodified rectified AC input; FIGS. 3G-3H illustrate two rectified modified AC waveforms having different off times. Alternatively, the on-off switch, which is used as a logic controller to the processor is replaced by an on-off (single-pole or three-way) switch that cuts power to the whole dimmer circuit.

Figure 3J:
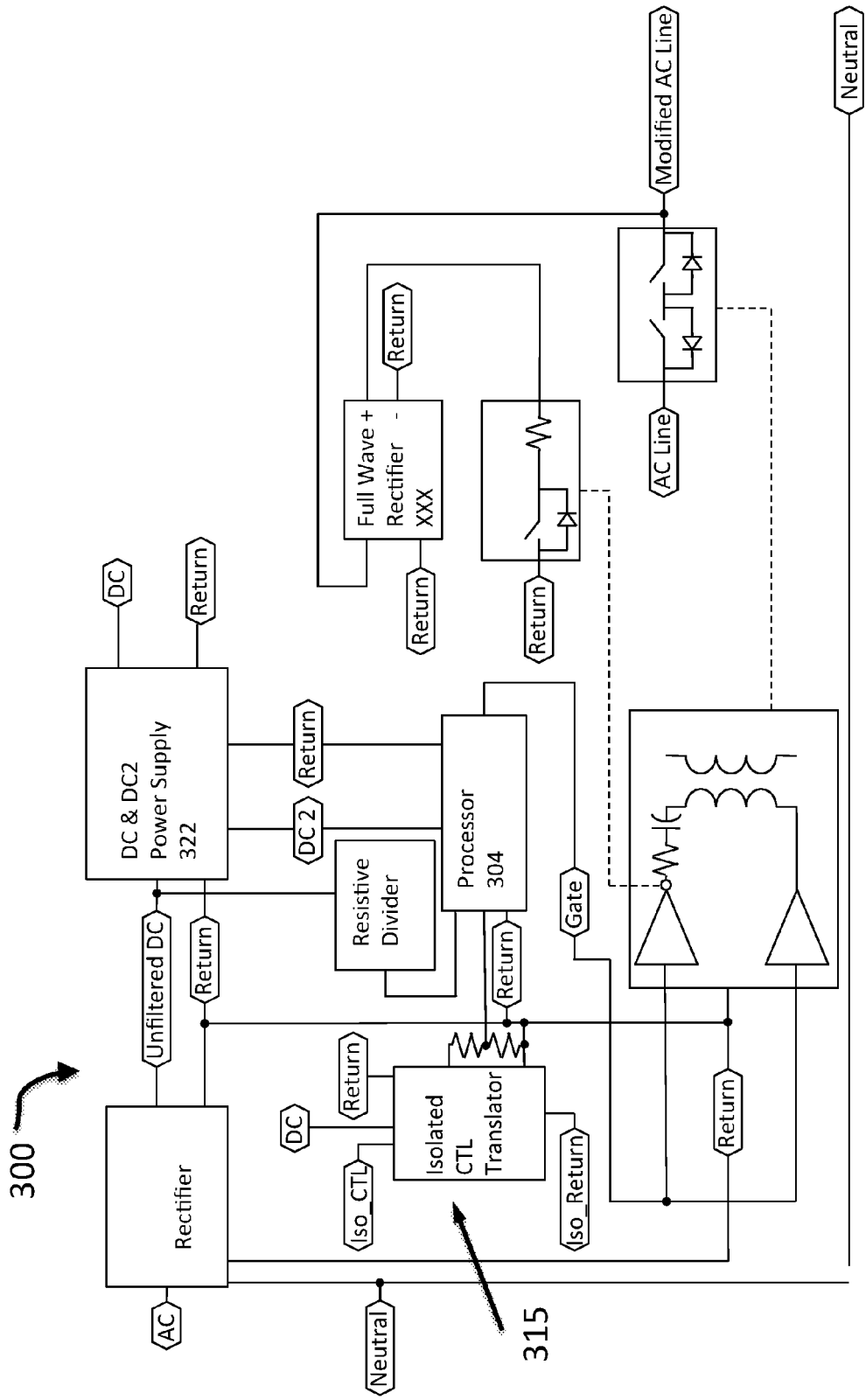
FIG. 3J is a schematic diagram depicting an embodiment of a modified AC encoder as described herein.

Inputs to the processor 304 may include at least one control signal input 314. The control signal input 314 may connect to an external port 315 that may accept an external control signal from any device capable of conveying a control signal; in some embodiments, the external port is connected to a wireless receiver that generates a control signal as described above. The external port 315 may be connected to any device that can generate a control signal, such as a dimmer switch such as a slide potentiometer, a potentiometer operated by a knob, a capacitive dimmer knob, a programmable logic controller, or other device. In some embodiments, the device supplying the control signal includes circuitry to isolate the device from the modified AC encoder 300; in other embodiments, the modified AC encoder 300 contains circuitry to isolate the external port 315 from the rest of the modified AC encoder 300. The external port 315 may be scaled by a resistive divider 315a to input a signal in a voltage range acceptable by the processor 304; for instance, where the processor 304 is configured to accept a 0-5 VDC control signal, the resistive divider 315a may divide the voltage of a 0-10 VDC control signal in half. The control signal input 314 may connect to a dimmer control 316 incorporated in the modified AC encoder 300. The dimmer control 316 may be a potentiometer, such as a dimmer slide potentiometer. The dimmer control 316 may also be calibrated to input a control signal over a range the processor 304 is configured to accept, such as a voltage control range from 0 to 5 VDC. In some embodiments, the modified AC encoder 300 includes both an external port 315 and a dimmer control 316 that can connect to the control signal input 314. The external port 315 and dimmer control 316 may connect via a switch 317 that enables one or the other to be chosen as the control signal source; the switch 317 may be a manual switch. In some embodiments, the modified AC encoder 300 has a dimmer control 316 and no external port 315; FIG. 3I is a block diagram depicting an embodiment of a modified AC encoder 300 having a dimmer control 316 and no external control signal port 315. In other embodiments, the modified AC encoder 300 has an external control signal port 315 and does not have a dimmer control 316; FIG. 3J is a block diagram depicting an embodiment of a modified AC encoder 300 that has an external control signal port 315 and no dimmer control 316. The control signal port 315 may connect to the rest of the modified AC encoder 300 via an isolated control signal translator, which electrically isolates the port 315 from the remainder of the circuitry in the modified AC encoder 300.

In some embodiments, the modified AC encoder 300 includes an on-off switch 318. In some embodiments, the processor 304 interprets the on-off switch 318 being placed in the "off" position as a command not to activate the gate drive circuit 305. In some embodiments, the bipolar switch 303 includes a resistor 319 that discharges the gate capacitance of each of the first MOSFET 306 and the second MOSFET 307 in the absence of pulses from the gate drive circuit 305; the discharge of the gate capacitance of both the first MOSFET 306 and the second MOSFET 307 may switch off both the first MOSFET 306 and the second MOSFET 307, causing the modified AC line to cease conducting, and cutting off power to all devices attached to the modified AC line, including drivers 100, loads 110 driven by the drivers 100, adapters 126 powered by the drivers 100, and modified AC decoders 200 powered by the drivers 100. In some embodiments, when the on-off switch 318 is in the "on" position, the processor converts the voltage at the control signal input 314 into on and off time signals as described above in reference to FIG. 3B.

Inputs to the processor 304 may include an AC line voltage sample input 320. In some embodiments, the line voltage sample input 320 provides a waveform representative of the AC line voltage waveform to the processor 304. In some embodiments, AC line voltage waveform is rectified by a rectifier 321 prior to being input to the AC line voltage sample input 320. The rectifier 321 may be any rectifier suitable for use as a rectifier 103 as disclosed above in reference to FIGS. 1A-1F. In some embodiments, the rectifier 321 is a full-wave rectifier. The rectifier 321 may be a bridge rectifier. The AC line voltage waveform may be reduced using a resistive divider 313 as described above in reference to FIG. 3B.

Inputs to the processor 304 may include a power supply 322. The power supply 322 may use a transient voltage suppressor 323 and capacitive filter 324 to produce a steady DC voltage from the AC line voltage, as described above in reference to FIGS. 1A-F. In some embodiments, the power supply 322 includes a diode 323a to further reduce the voltage to the required steady value. The steady DC voltage may be 10 VDC. In some embodiments, the AC line voltage is provided to the power supply 322 in rectified form by way of the rectifier 321. The power supply 322 may include a voltage converter 325 to convert the power supply voltage to a second voltage; the voltage converter 325 may be constructed as described above for a DC voltage converter 208 in reference to FIGS. 2A-2B.

The voltage converter 325 may produce a 5 VDC voltage. In some embodiments, the voltage from the voltage converter 325 powers the processor. In some embodiments, the voltage from the voltage converter 325 powers the non-inverting gate driver 311. In some embodiments, the voltage from the voltage converter 325 powers the inverting gate driver 312. In some embodiments, the voltage from the power supply 322 itself powers the dimmer control 316.

In some embodiments, the discharge circuit 309 drains parasitic capacitances from the first MOSFET 306 and second MOSFET 307 during off times through a single transistor 326 connecting the modified AC line to return through a full-wave rectifier 327. The transistor 326 may conduct during the off time, connecting and discharging any non-zero voltage on the modified AC line across a resistor during off times. Any suitable circuit may switch the transistor 326 on during the off time. For instance, the transistor 326 may be switched on by positive voltages from the inverting gate driver 312, so that the transistor 326 switches on; when the non-inverting square wave is logic 1, and the inverting square wave is logic 0. As an example, the transistor 326 may be a MOSFET with a gate connected to the output of the inverting MOSFET driver. The drain circuit 309 may contain any other set of elements usable to drain the parasitic capacitances; for instance, instead of being rectified, the drain circuit 309 may contain a bipolar switch that opens during off-times, similarly to the bipolar switch 303 described above.

The modified AC encoder 300 may be contained in a housing (not shown). The housing may be shaped to fit in a wall recess. In some embodiments, the housing may be fastened in the wall recess; the housing may have screw holes or fastener-free engagement members allowing the housing to snap in place in a wall recess. The housing may include manual controls permitting the user to operate the dimmer 316 or the on-off switch 318; for instance, the on-off switch 318 may be a conventional light switch. The on-off switch 318 may be a push button switch. The dimmer 316 may connect to manual slide switch or to a rotatable knob.

Figure 1D:
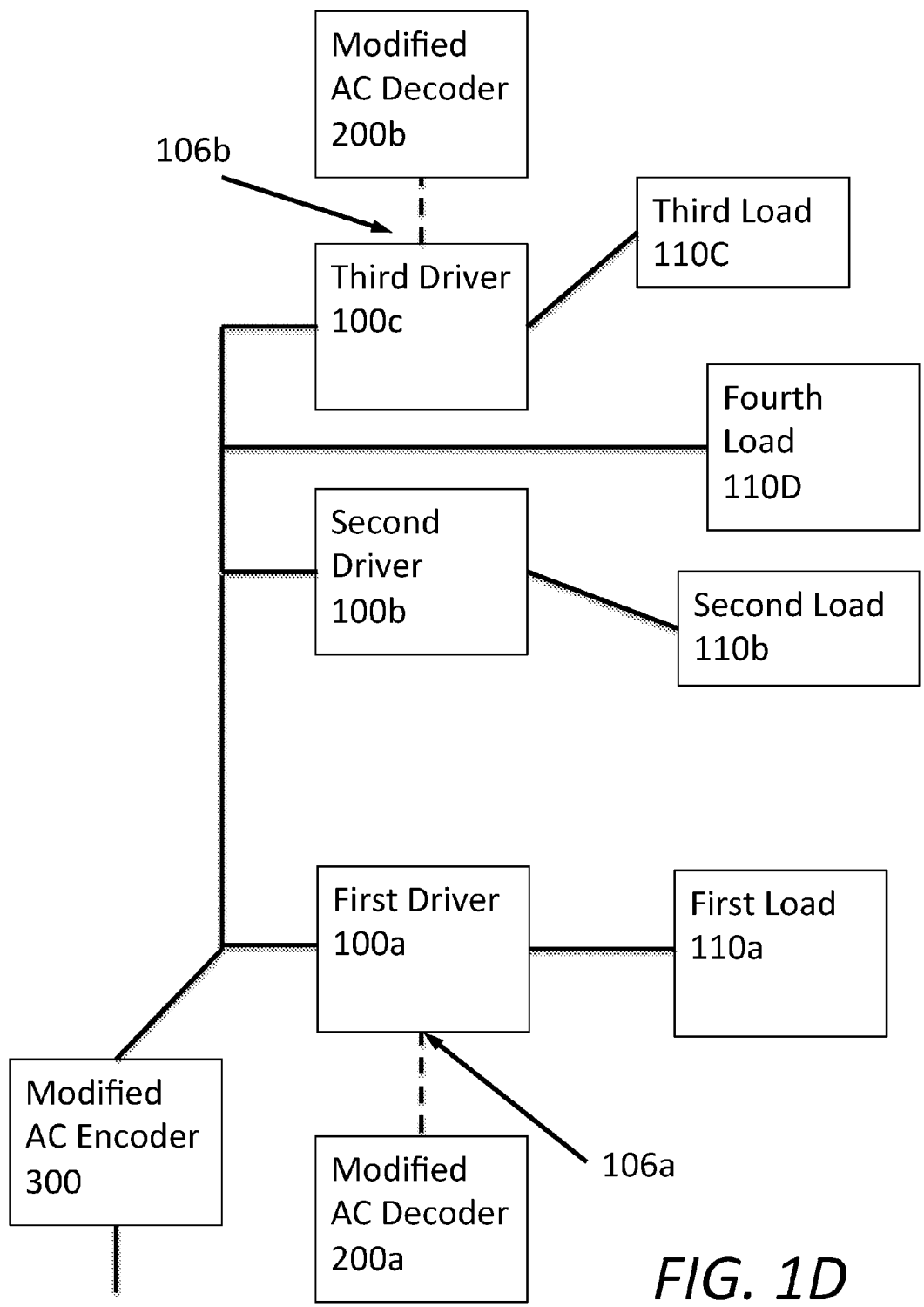
FIG. 1D is a schematic diagram depicting an embodiment of a network employing elements described herein.
Figure 1E:
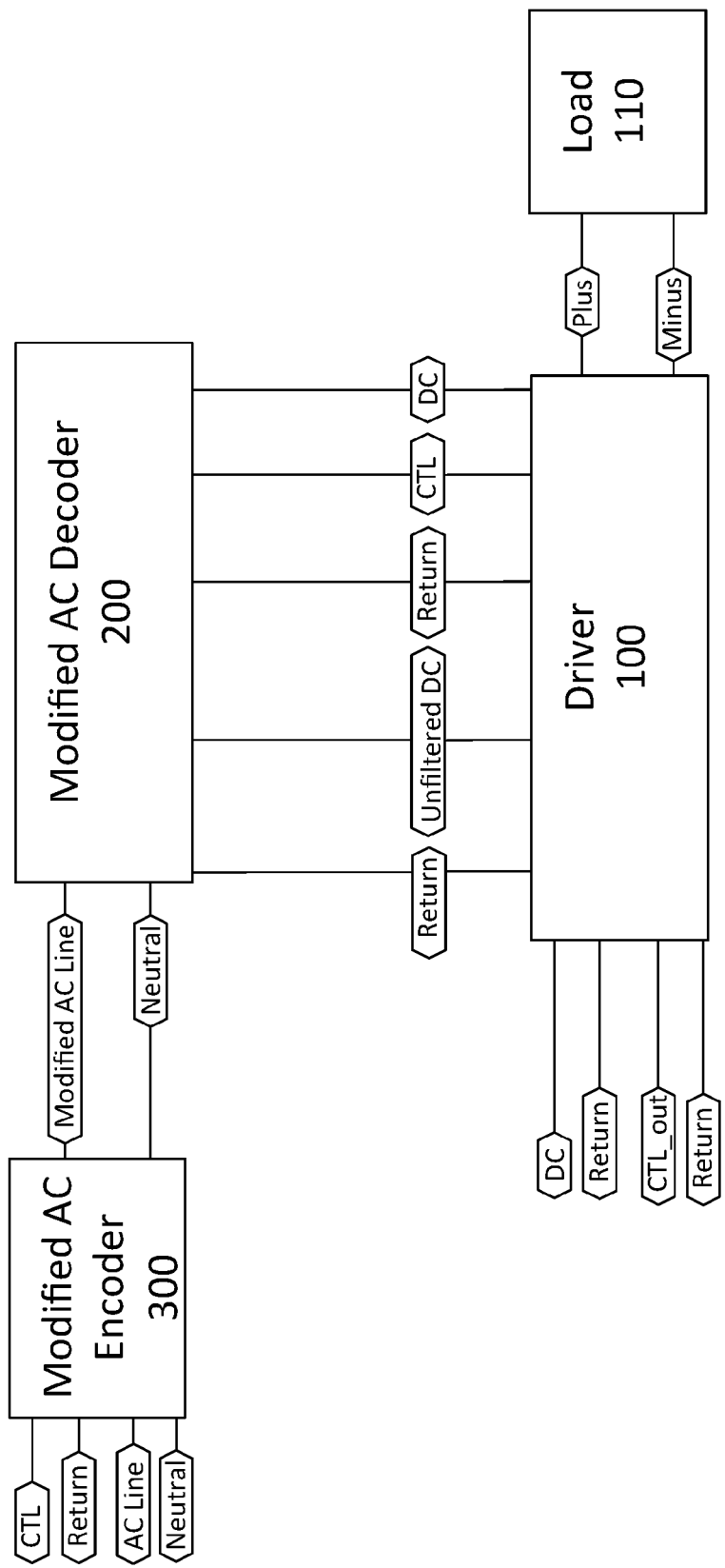
FIG. 1E is a block diagram depicting an embodiment of a network employing elements described herein.
Figure 1F:
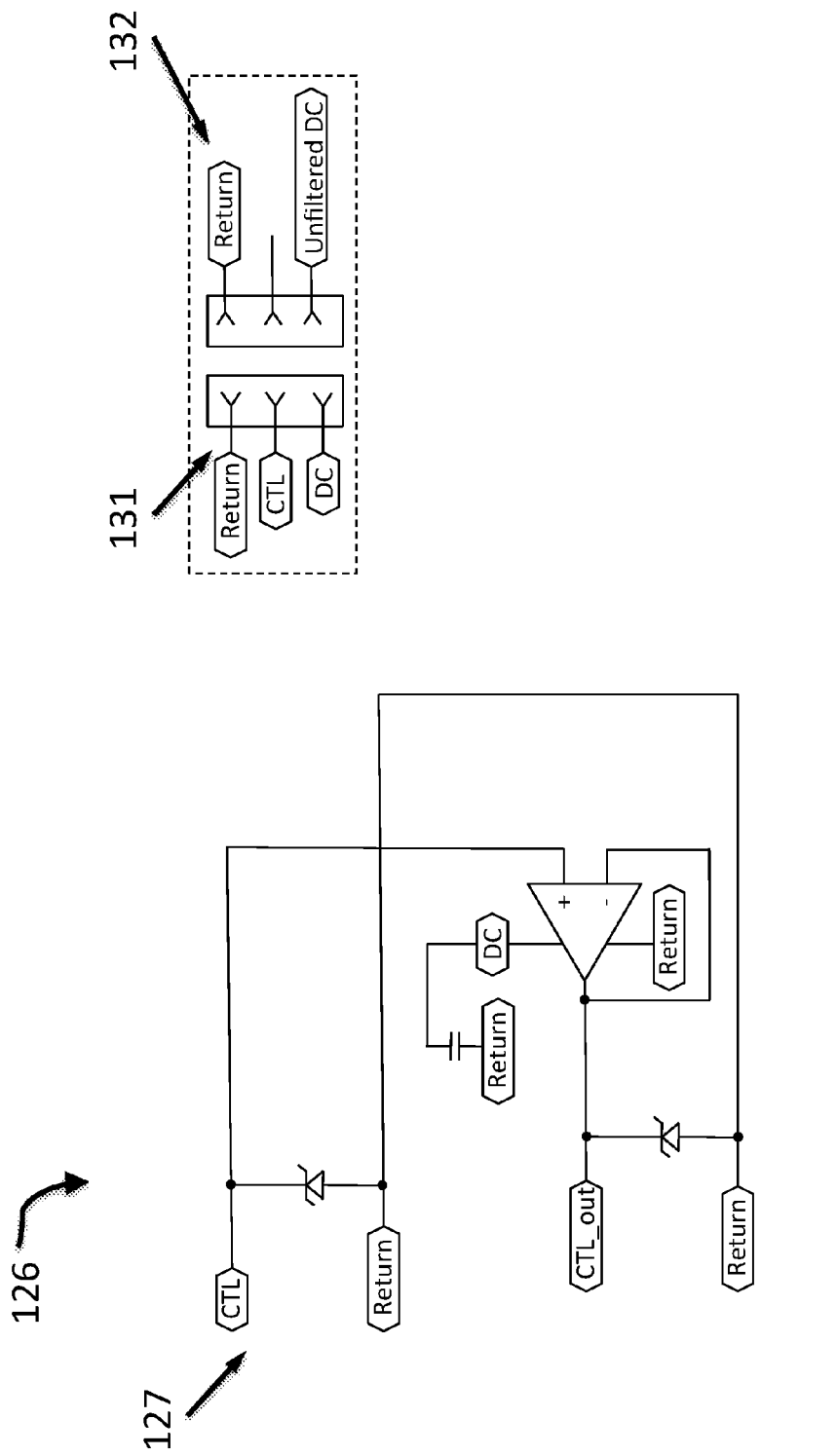
FIG. 1F is a schematic diagram depicting an embodiment of an adapter as described herein

FIG. 1D illustrates an exemplary network in which a modified AC encoder 300 feeds a modified AC signal to a first driver 100a driving a first load 110a, a second driver 100b driving a second load 110b, a third driver 100c driving a third load 110c, and a fourth load 110d that is directly connected to the modified AC line voltage. In the non-limiting example, the first driver 100a and third driver 100c are connected to modified AC decoders 200a-b, which convert the off times encoded by the modified AC encoder 300 into control signals. As a result, the first driver 100a and third driver 100c may reduce the current to the first load 110a and third load 110c as dictated by control signal encoded in the modified AC line by the modified AC encoder 300. Continuing the example, the second driver 100b is not connected to a modified AC decoder, and so it drives the second load 110b at full power. The fourth load 110d may be any AC appliance; for instance, the fourth load 110d may be an electric appliance that is not lighting. The other electric appliance may require a substantially normal AC signal to function, and may run effectively at any dimming level. The fourth load 110d may run off of the modified AC line exactly as if the modified AC line were a regular AC line. If the off switch of the modified AC encoder 300 is activated the modified AC line may cease to conduct electricity, and, the first driver 100a, first load 110a, second driver 100b, second load 110b, third driver 100c, third load 110c, and the fourth load 110d may all cease operating.

In some embodiments, the modified AC encoder 300, modified AC decoder 200, adapter 126, and driver 100 as described above presents a simple design requiring a minimal number of low cost components for implementation. By gating the AC Line "ON" and "OFF" based upon the commanded brightness, the modified AC line supplies power to dimmable and non-dimmable fixtures alike. Non-dimmable fixtures that are not configured to decode the signal from the modified AC encoder 300 may run at full power on the modified AC line, but turn on and off when the power to the fixtures is cut in response to operation of the on-off switch 318. The modified AC line functions essentially the same way as the unmodified AC line for any device not capable of decoding the off time signal produced by the modified AC encoder 300; thus, in some embodiments, when the modified AC encoder 300 commands devices capable of decoding the off time signal to dim, other devices driven by the modified AC line continue to run at full power as before.

Figure 4:
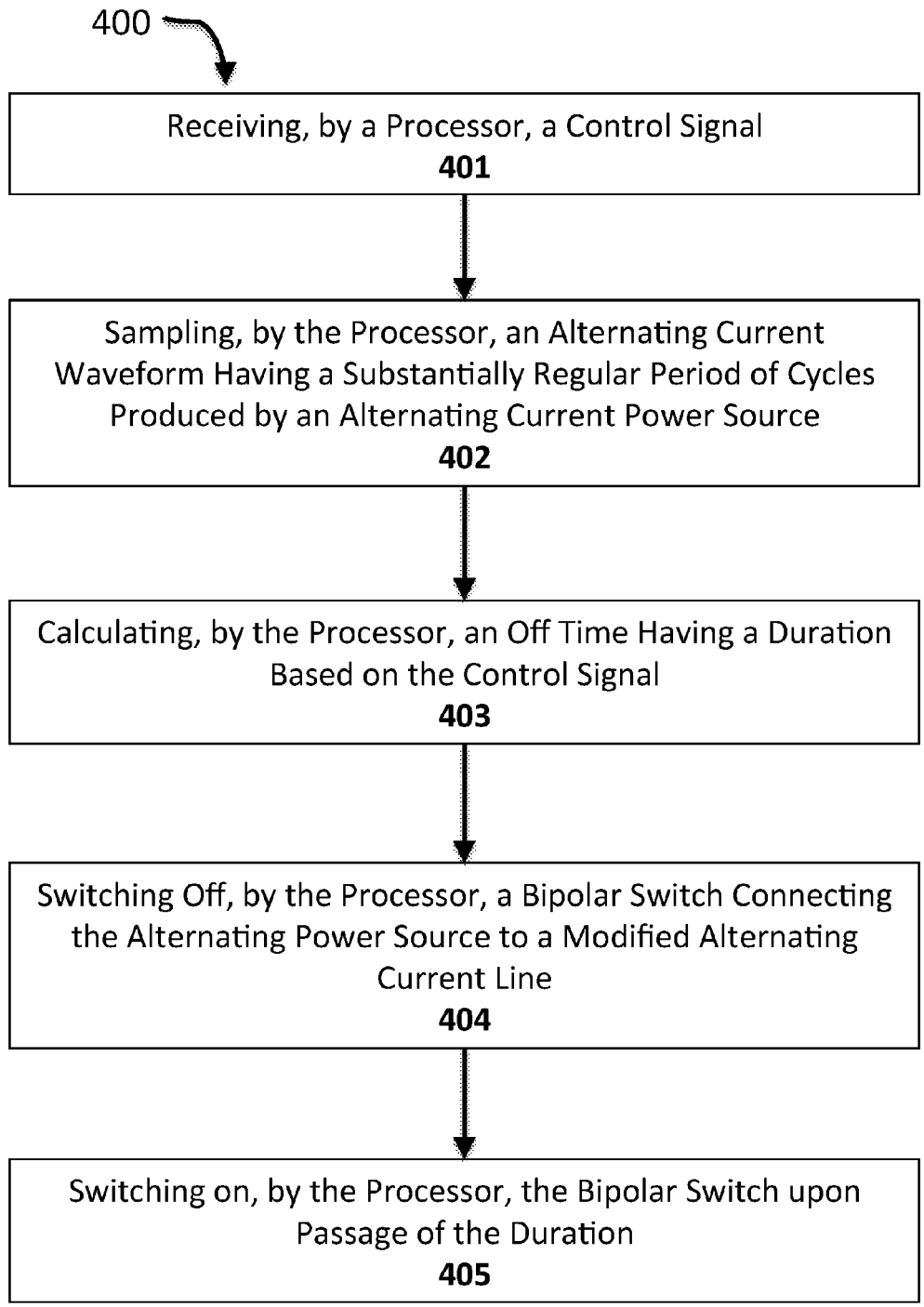
FIG. 4 is a flow diagram illustrating a method for encoding signals in a modified alternating current line.

FIG. 4 illustrates some embodiments of a method 400 for encoding signals in a modified alternating current line. The method 400 includes receiving, by a processor, a control signal (401). The method 400 includes sampling, by the processor, an alternating current waveform having a substantially regular period of cycles produced by an alternating current power source (402). The method 400 includes calculating, by the processor, an off time having a duration based on the control signal (403). The method 400 includes switching off, by the processor, a bipolar switch connecting the alternating power source to a modified alternating current (404). The method 400 includes switching on, by the processor, the bipolar switch upon passage of the duration (405).

Referring to FIG. 4 in greater detail, and by reference to FIGS. 1A-3J, the processor 304 receives a control signal (401). This may be implemented as described above in reference to FIGS. 1A-3J. The control signal may be any control signal as described above in connection with FIGS. 1A-3J. As a non-limiting example, the control signal may be a direct current voltage control signal, as described above in reference to FIGS. 1A-3J; the control signal may be a 0-10 VDC control signal. The processor 304 may receive the control signal via a control input 314 as described above in reference to FIGS. 3A-3J. The processor 304 may receive the control signal from the dimmer control 316. The processor 304 may receive the control signal from an external device, such as a wireless device.

The processor 304 samples an alternating current waveform having a substantially regular period of cycles produced by an alternating current power source (402). The processor 304 may sample the waveform using the AC line voltage sample input 320 as described above in connection with FIGS. 3A-3J.

The processor 304 calculates an off time having a duration based on the control signal (403). This may be implemented as described above in reference to FIGS. 3A-3J. In some embodiments, the processor 304 calculates the duration of the off-time by calculating a function of the control signal; for instance where the control signal is a 0-10 VDC signal, the processor 304 may calculate the duration using a linear function whereby 0 maps to an off time duration of 2 milliseconds, 1 maps to an off time duration of 1 millisecond, and control signal values in between map to durations between 1 and 2 milliseconds according to a linear function. In other embodiments, the processor 304 maps the control signal to a duration stored in memory of the processor 304.

The processor 304 switches off a bipolar switch 303 connecting the alternating power source to a modified alternating current (404). In some embodiments, the processor 304 switches off the bipolar switch 303 as described above in connection with FIGS. 3A-3J. In some embodiments, the processor 304 switches off the bipolar switch substantially half of the duration prior to a zero-crossing time in the alternating current waveform; for instance, where the off time duration is 2 milliseconds, the processor 304 may switch off the bipolar switch 1 millisecond prior to the zero-crossing time. The processor 304 may switch off the bipolar switch substantially half of the duration prior to the zero-crossing time by calculating the zero-crossing time, and switching the bipolar switch off approximately half the duration before the zero-crossing time. In some embodiments, the processor 304 calculates the zero-crossing time by detecting a voltage peak time in the alternating current waveform solving an equation describing the waveform for a zero-intercept time in the alternating current waveform; the equation may be a sinusoidal equation for the voltage of an alternating current power source, as described above in reference to FIGS. 3A-3J. Solving the equation may involve adding a quarter of the period to the voltage peak time; for instance, a regular sine wave has a zero-intercept 1 quarter of the period of the sine wave following a voltage peak. The voltage peak may be a local minimum voltage. The voltage peak may be a local maximum voltage.

In other embodiments, the processor 304 detects a logic zero time at which the sampled alternating current waveform drops to logic zero, retrieves a stored value substantially equal to the difference between the logic zero time and the zero-crossing point, subtracts half of the duration from the difference to obtain a switch-off time, and switches off the bipolar switch at the switch-off time. The logic zero detection point may be set to precede the zero-crossing point by the stored value using the resistive divider 313, as described above in reference to FIGS. 1A-3J; in some embodiments, where the resistive divider 313 is adjustable, a user may adjust the resistive divider so that the logic zero detection point occurs an amount of time substantially equal to the stored value prior to the zero-crossing point.

The processor 304 switches on the bipolar switch 303 upon passage of the duration (405); that is, when an amount of time equal to the duration has passed since the processor 304 has switched off the bipolar switch 303, the processor 304 may switch the bipolar switch 303 back on. In some embodiments, the processor 304 switches on the bipolar switch 303 as described above in connection with FIGS. 1A-3J. The processor 304 may switch the bipolar switch 303 off, and back on after the duration has elapsed, multiple times; for instance, the processor 304 may switch the bipolar switch 303 off prior to each zero-crossing point, and back on after each zero-crossing point. In some embodiments, interrupting the modified AC waveform around each zero-crossing point enables devices such as the decoder 200 described above in reference to FIGS. 2A-2F to determine the off time duration accurately despite voltage transients or other temporary phenomena affecting the AC waveform.

FIG. 5 illustrates some embodiments of a method 500 for decoding a modified alternating current signal. The method 500 includes sensing, by a processor coupled to a modified alternating current line having a modified alternating current signal, an off time in the modified alternating current signal (501). The method 500 includes emitting, by the processor, a control signal based on the detected off time (502).

Referring to FIG. 5 in greater detail, and by reference to FIGS. 1A-3J, the processor 201 senses an off time in the modified alternating current signal (501). In some embodiments, the processor 201 senses the off time as described above in reference to FIGS. 2A-2F. As a non-limiting example, the processor 201 may sense the off time by detecting when the modified alternating current signal drops below a first threshold and detecting when the modified alternating current signal subsequently exceeds above a second threshold. The threshold may be a positive or negative number; for instance, the threshold may represent an absolute value, so that a negative or positive voltage that has an absolute value exceeding the threshold exceeds the threshold.

The processor 201 emits a control signal based on the detected off time (502). In some embodiments, the processor 201 emits the control signal as described above in reference to FIGS. 2A-2F. As a non-limiting example, the processor 201 may emit the control signal by emitting a pulse width modulated signal. In some embodiments, the processor 201 maps the off time to a voltage level of a voltage control signal. The processor 201 may transmit a series of pulses having an average voltage level substantially equal to the mapped voltage level; where there is a PWM to DC converter 202, the converter 202 may convert the signal to a voltage control signal, as described above in reference to FIGS. 2A-2F. In some embodiments, the processor 201 executes a running averaging filter as described above in reference to FIGS. 2A-2F. For instance, the processor 201 may sense a plurality of off-times in the modified alternating current signal, and calculate an average of the plurality of off times. The processor 201 may emit the control signal based on the calculated average.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

What is claimed is:

1. A smart dimming network encoder, connected to an alternating current power source having a substantially regular period, the encoder comprising:
   a bipolar switch connecting the alternating current power source to a modified alternating current line, the bipolar switch having an on state permitting the modified alternating current line to conduct alternating current from the alternating current power source and an off state preventing conduction on the modified alternating current line; wherein the bipolar switch comprises a first transistor having a first control terminal such that when the first control terminal has a positive voltage in excess of a threshold amount, the first transistor is on, and a second transistor having a second control terminal such that when the second control terminal has a positive voltage in excess of the threshold amount, the second transistor is on;
   a processor coupled to the bipolar switch, the processor configured to receive a control signal at a control signal input and to switch the bipolar switch to the off state for an off time having a duration corresponding to the control signal; and
   a gate driver, the gate driver configured to send a negative voltage pulse of at least the threshold amount to each of the first control terminal and second control terminal at the beginning of the off time, and to send a positive voltage pulse equal to at least the threshold amount to each of the first control terminal and the second control terminal at the end of the off time;
   wherein the gate driver further comprises a transformer configured to issue a negative voltage pulse in response to a negative square wave input generated by the processor and to issue a positive voltage pulse in response to a positive square wave input generated by the processor.

2. The encoder of claim 1, wherein each of the first transistor and the second transistor is a voltage-controlled transistor having capacitance at its control terminal to hold voltage at the control terminal above the threshold amount for at least one half-cycle of the alternating current power source.

3. The encoder of claim 1, wherein the gate driver further comprises an inverting transistor driver and a non-inverting transistor driver, the inverting transistor driver and non-inverting transistor driver configured to receive input from the processor and to output a negative square wave output to the transformer at the beginning of the off time and a positive square wave output to the transformer at the end of the off time.

4. The encoder of claim 1 further comprising a discharge circuit connected to the modified alternating current line, the discharge circuit comprising a transistor configured to switch on during the off-time and discharge non-zero voltages through a resistor.

5. The encoder of claim 1, wherein the processor further comprises a voltage sample input connected to the alternating current power source.

6. The encoder of claim 5, wherein the voltage sample input is connected to the alternating current power source by way of a full-wave rectifier.

7. The encoder of claim 5, wherein the voltage sample input is connected to the alternating current power source by way of a resistive divider.

8. The encoder of claim 7, wherein the resistive divider is adjustable.

9. The encoder of claim 1, wherein the control signal input is connected to an external device adapted to transmit a control signal.

10. The encoder of claim 1, further comprising a dimmer control connected to the control signal input.

11. The encoder of claim 1 further comprising a kill switch coupled to the processor, wherein the processor is configured to stop sending signals to the bipolar switch when the kill switch is activated, and the bipolar switch is configured to switch off when not receiving signals from the processor.

12. A method for encoding signals in a modified alternating current line, the method comprising:
    receiving, by a processor, a control signal;
    sampling, by the processor, an alternating current waveform having a substantially regular period of cycles produced by an alternating current power source;
    calculating, by the processor, an off time having a duration based on the control signal;
    switching off, by the processor, a bipolar switch connecting the alternating power source to a modified alternating current;
    switching on, by the processor, the bipolar switch upon passage of the duration; and
    issuing, by a transformer, a negative voltage pulse in response to a negative square wave input generated by the processor and to issue a positive voltage pulse in response to a positive square wave input generated by the processor.

13. The method of claim 12, wherein switching off the bipolar switch further comprises switching off the bipolar switch substantially half of the duration prior to a zero-crossing time in the alternating current waveform.

14. The method of claim 13, wherein switching off the bipolar switch further comprises:
    calculating, by the processor, the zero-crossing time; and
    switching the bipolar switch off approximately half the duration before the zero-crossing time.

15. The method of claim 14, wherein calculating the zero-crossing time further comprises:
    detecting a voltage peak time in the alternating current waveform; and
    solving an equation describing the waveform for a zero-intercept time in the alternating current waveform.

16. The method of claim 15, wherein solving for the zero-intercept time further comprises adding a quarter of the period to the voltage peak time.

17. The method of claim 13, wherein switching off the bipolar switch further comprises:
    detecting, by the processor, a logic zero time at which the sampled alternating current waveform drops to logic zero;
    retrieving, by the processor, a stored value substantially equal to the difference between the logic zero time and the zero-crossing point;

subtracting, by the processor, half of the duration from the difference to obtain a switch-off time; and
switching off the bipolar switch at the switch-off time.

\* \* \* \* \*